US008247919B2

(12) United States Patent
Hoffmann et al.

(10) Patent No.: US 8,247,919 B2
(45) Date of Patent: *Aug. 21, 2012

(54) POWER STATION WITH GRID FREQUENCY LINKED TURBINE AND METHOD FOR OPERATING

(75) Inventors: Jürgen Hoffmann, Untersiggenthal (CH); Thomas Meindl, Kirchdorf (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/886,868

(22) Filed: Sep. 21, 2010

(65) Prior Publication Data

US 2011/0018265 A1    Jan. 27, 2011

Related U.S. Application Data

(63) Continuation of application No. PCT/EP2009/053499, filed on Mar. 25, 2009.

(30) Foreign Application Priority Data

Mar. 25, 2008  (CH) ..................................... 0444/08

(51) Int. Cl.
    *F01D 15/10*    (2006.01)
(52) U.S. Cl. ........................................................ 290/52
(58) Field of Classification Search .................... 290/52, 290/40 C; 307/151; 363/152
    See application file for complete search history.

(56) References Cited

U.S. PATENT DOCUMENTS

| | | | | |
|---|---|---|---|---|
| 6,519,170 | B2 * | 2/2003 | Lacaze et al. | 363/152 |
| 6,530,240 | B1 * | 3/2003 | Kountz et al. | 62/611 |
| 7,180,270 | B2 * | 2/2007 | Rufer et al. | 322/20 |
| 7,317,998 | B2 * | 1/2008 | Lacaze et al. | 702/76 |
| 7,466,574 | B2 * | 12/2008 | Lacaze | 363/148 |
| 7,526,926 | B2 * | 5/2009 | Rasmussen et al. | 62/619 |
| 7,586,216 | B2 * | 9/2009 | Li et al. | 307/151 |

(Continued)

FOREIGN PATENT DOCUMENTS

DE    102004016453    11/2005

(Continued)

OTHER PUBLICATIONS

Ackenheil, R., et al., "Primary Frequency Control for Combined Cycle Power Plants," VGB Powertech, Bd. 86, Nr. 3, Jan. 1, 2006, pp. 76-78, VGB Powertech, Essen, Germany.

(Continued)

*Primary Examiner* — Tho D Ta
(74) *Attorney, Agent, or Firm* — Cermak Nakajima LLP; Adam J. Cermak

(57) ABSTRACT

A combined-cycle power plant (10) has at least one power train (60) including a steam turbine (24) and a second generator (8) directly driven by the steam turbine (24) and generating alternating current, the output of which generator is connected to a power grid (21) having a given grid frequency (F), and at least one power train (11) of a gas turbine (12) and a first generator (18) driven directly by the gas turbine (12) and generating alternating current with an operating frequency, the output of which generator is connected to a power grid (21) having a predetermined grid frequency. An electronic decoupling device or a variable electronic gear unit (27) decouples the operating frequency from the grid frequency and is arranged between the first generator (18) and the power grid (21). Such a plant allows both flexible steady-state operation with high overall efficiency as well as flexible transient operation.

35 Claims, 14 Drawing Sheets

U.S. PATENT DOCUMENTS

| | | | |
|---|---|---|---|
| 7,944,094 B2 * | 5/2011 | Hoffmann | 290/52 |
| 2005/0237774 A1 * | 10/2005 | Lacaze et al. | 363/148 |
| 2006/0232071 A1 | 10/2006 | Althaus | |
| 2006/0272331 A1 * | 12/2006 | Bucker et al. | 60/774 |
| 2007/0132249 A1 | 6/2007 | Andrew et al. | |

FOREIGN PATENT DOCUMENTS

| | | |
|---|---|---|
| DE | 102004016463 | 11/2005 |
| DE | 102004016464 | 11/2005 |
| EP | 0644647 | 3/1995 |
| EP | 0858153 | 8/1998 |
| EP | 1199794 | 4/2002 |
| EP | 1561273 | 8/2005 |
| EP | 1575154 | 9/2005 |
| EP | 1775430 | 4/2007 |
| GB | 2300884 | 11/1996 |
| WO | WO2009/118332 | 10/2009 |

OTHER PUBLICATIONS

Joos, F., et al., "Field experience with the sequential combustion system of the GT24/GT26 gas turbine family," ABB Review 1998, Nr. 5, pp. 12-20, The ABB Group, Zurich, Switzerland.

Offringa, L. J. J., et al., "A 1600 kW IGBT Converter with Interphase Transformer for High Speed Gas Turbine Power Plants," Proc. IEEE-IAS Conf. 2000. 4, Oct. 8-12, 2000, Rome, 2000, pp. 2243-2248.

Search Report for Swiss Patent App. No. 00444/2008 (Aug. 13, 2008).

* cited by examiner

POWER STATION WITH GRID FREQUENCY LINKED TURBINE AND METHOD FOR OPERATING

This application is a Continuation of, and claims priority under 35 U.S.C. §120 to, International application no. PCT/EP2009/053499, filed 25 Mar. 2009, and claims priority therethrough under 35 U.S.C. §§119, 365 to Swiss application no. No. 00444/08, filed 25 Mar. 2008, the entireties of which are incorporated by reference herein.

BACKGROUND

1. Field of Endeavor

The present invention relates to the field of power plant technology. It relates to a combined-cycle power plant with electronic decoupling or electronic frequency conversion between the gas turbine and power grid and a steam turbine connected directly to the power grid via a generator, and to a method for operating such a power plant.

2. Brief Description of the Related Art

Large power plants with powers within the range of more than 100 MW, in which a current-generating generator is driven by a gas and/or a steam turbine and feeds the generated electrical power into a power grid having a predetermined grid frequency (e.g. 50 or 60 Hz) usually have a fixed coupling between the (mechanical) speed of the turbine and the grid frequency. In this arrangement, the output of the generator is connected in a frequency-locked manner to the power grid via a system connection whilst it is driven either directly via the turbine (1-shaft plant) or speed-coupled via a mechanical gear unit. Such configurations of power plants are reproduced in a greatly simplified manner in FIGS. 2 and 3. Using gear units, it is only possible to achieve fixed transmission ratios between grid frequency and turbine. However, solutions are also conceivable in which the generator is driven by a utility turbine which can be run at a speed deviating from the actual gas turbine.

FIG. 2 shows, in a greatly simplified representation, a power plant 10' of the known type which generates power with a gas turbine 12 with a first generator 18 coupled thereto and a steam turbine 24 with a second generator 8 coupled thereto and which is feed their electric power into a power grid 21. The gas turbine 12 and the generator 18 are joined by a common shaft 19 and form a power train 11. In the simplest case, the gas turbine includes a compressor 13 which sucks in and compresses combustion air via an air inlet 16. The compressor 13 can be composed of a number of cascaded part-compressors which operate at a rising pressure level and possibly provide for intermediate cooling of the compressed air. The combustion air compressed in the compressor 13 passes into a combustion chamber 15 into which liquid (e.g. oil) or gaseous (e.g. natural gas) fuel is nozzle-injected via a fuel supply 17 and burnt with consumption of combustion air. The hot gases emanating from the combustion chamber 15 are expanded in a subsequent turbine 14 whilst performing work and thus drive the compressor 13 and the first generator 18 coupled thereto. The exhaust gas, which is still relatively hot on emerging from the turbine, is sent through a subsequent heat recovery steam generator 23 in order to generate steam for operating a steam turbine 24 in a separate water steam cycle 25. Condenser, feed water pump and other systems of the water-steam cycle 25 are not shown in order to simplify the representation. Such a combination of gas turbine and steam power plant is called a combined-cycle power plant. In this arrangement, the steam turbine 24 can be coupled to the first generator 18 on the side opposite the turbine 14; gas turbine 12, first generator 18 and steam turbine 24 then form a so-called single-shaft power train. However, the steam turbine 24 can also drive a separate second generator 8 on a separate power train 60 as shown in FIG. 2. Various combinations are known for multi-shaft plants. For example, so-called 2-on-1 arrangements are widely used in which a steam turbine 24 on a power train 60 with a second generator 8 is supplied with steam by boilers 23 following two gas turbines 12. In this arrangement, the gas turbines 12 are in each case arranged on a power train 11 having its own first generator 18. Analogously, there are also arrangements in which the steam from three or more boilers 23 following gas turbines 12 is used for driving a steam turbine 24.

In the case of the one-shaft gas turbine of FIG. 2, the speed of the gas turbine 12 has a fixed ratio to the frequency, generated in the first generator 18, of the alternating voltage which must be equal to the grid frequency of the power grid 21. In the case of the large gas turbine units normally used today, with powers of over 100 MW, a speed of the gas turbine of 3600 rpm (e.g. ALSTOM's gas turbine GT24) is allocated to the generator frequency or grid frequency of 60 Hz and a speed of 3000 rpm (e.g. ALSTOM's gas turbine GT26) is allocated to the generator frequency of 50 Hz.

If it is intended to achieve a different ratio between the speed of the gas turbine 12 and the generator or grid frequency, a mechanical gear unit 26 can be inserted in principle between the shaft 19 of the gas turbine 12 and the first generator 18 (power train 11') in a power plant 10" according to FIG. 3, which gear unit is normally constructed as a step-down gear unit and thus provides for higher speeds and smaller constructions of the gas turbine 12. Corresponding step-down gear units are also used for operating small steam turbines. However, such mechanical gear units 26 are typically only used for powers of less than 100 MW to 120 MW for reasons of strength. On the other hand, the large powers per gas turbine of over 100 MW and the high efficiencies are mainly achieved with one-shaft machines which rotate comparatively slowly.

This then results in the situation shown in FIG. 1: above about 100 MW useful power, there are individual one-shaft gas turbines which are designed and optimized for a fixed speed of either 3000 rpm (for 50 Hz; GT26) or 3600 rpm (for 60 Hz; GT24) (F. Joos et al., Field experience with the sequential combustion system of the GT24/GT26 gas turbine family, ABB Review no. 5, p. 12-20 (1998)). Above 100 Hz and at powers below 100 MW, almost any alternating-voltage frequencies are possible by configurations with utility turbine or gear unit or by multi-shaft gas turbines (shaded area in FIG. 1). In this, the powers of the gas turbines over frequency follow a curve A whilst the efficiency $\eta$ follows curve B. Large powers with high efficiencies can thus be mainly achieved at low speeds where, however, only singular solutions are available.

To reduce the manufacturing costs in the singular solutions, it has already been proposed in U.S. Pat. No. 5,520,512 to construct at least parts of the turbines identically in gas turbine plants for different system frequencies. In this arrangement, however, the rigid coupling between the speed of the gas turbine and the grid frequency remains unchanged.

In U.S. Pat. No. 6,628,005 it has been proposed to render a one-shaft plant having a turbine and a generator with a predetermined speed useable for different system frequencies of 50 Hz and 60 Hz by selecting a generator frequency between the two system frequencies of, e.g. 55 Hz and to add or subtract 5 Hz with a frequency differentiator depending on the grid frequency. Here, too rigid coupling is retained.

The rigid coupling between turbine speed and grid frequency for existing plant concepts with existing turbine components resulted in restrictions in the optimization of the steady-state operation. In addition, the transient behavior is also impaired. For example, power dips occur in the turbine or, respectively, thermal and mechanical loading occur during the dynamic control for supporting the grid frequency due to a rise in the gas turbine inlet temperature. Furthermore, rapid transients lead to increased loads.

The optimization in the new design of components or power plants is also restricted due to the rigid coupling between turbine speed and grid frequency. In particular, power plant turbines are limited in the magnitude of their power due to the predetermined coupling to the grid frequency (see curve A in FIG. 1).

From U.S. Pat. No. 5,694,026, a one-shaft-turbine-generator unit without a step-down gear unit is known in which a static frequency converter is arranged between the output of the generator and the power grid, with the aid of which frequency converter the alternating-voltage frequency generated by the generator is converted into the frequency of the power grid. When the gas turbine is started, the generator is used as a motor, said motor being supplied with energy from the power grid via the static frequency converter. The converter consists of a direct-current link circuit formed by an inductance.

From U.S. Pat. No. 6,979,914, a power plant with a one-shaft arrangement of a gas turbine and a generator is known in which a converter is also provided between the generator output and power grid in order to adapt the alternating voltage generated by the generator to the grid frequency. In this case, a direct-voltage link circuit is arranged in the converter.

From the article by L. J. J. Offringa, L. J. J. et al., "A 1600 kW IGBT converter with interface transformer for high speed gas turbine power plants", Proc. IEEE-IAS Conf. 2000. 4, 8-12 Oct. 2000, Rome, 2000, pp. 2243-2248, a power plant with a rapidly rotating gas turbine (18,000 rpm) and comparatively low output power (1600 kW) is known in which frequency decoupling between generator and power grid is achieved by a converter with direct-voltage link circuit.

In the known power plants with decoupling between generator output and power grid by a frequency converter with direct-current or direct-voltage link circuit, a resultant disadvantage is that the converters entail not inconsiderable power losses which, in power plants with a one-shaft power train and powers of more than 100 MW, cancel out again a part of the improvement in efficiency achieved in this area.

SUMMARY

One of numerous aspects of the present invention includes a combined-cycle power plant which is distinguished by flexible operation and, at the same time, high efficiency, and also a method for its optimized operation.

Another aspect of the invention includes detaching the at least one gas turbine generator unit of a combined-cycle power plant from the power grid with respect to frequency by an electronic device and operating the at least one steam turbine coupled to the power grid with respect to frequency, via a generator.

By this scheme, the power plant can be adjusted and corrected optimally for different boundary conditions at the design point and during operation without the high design efficiency being significantly reduced. Apart from the steady-state operation, methods embodying principles of the present invention include an optimization of the operation in the case of under- and over-frequency events.

In the introduction of speed control for optimizing the operation of the power plant and for grid-frequency-independent operation of a power plant, it appears initially clear to decouple both the steam turbine and gas turbine from the electrical power grid.

It is noteworthy that the unequal treatment of gas turbine and steam turbine is advantageous both compared with the conventional fixed coupling of both components to the power grid and compared with the clear decoupling of both components from the power grid.

A plant with fixed power grid coupling of the steam turbine and a gas turbine which is frequency-decoupled from the power grid allows both a flexible steady-state operation with high overall efficiency and flexible transient operation.

Various types of frequency converters are suitable as electronic devices for detaching the gas turbine generator unit from the power grid with respect to frequency.

For example, matrix converters are a type of suitable frequency converters.

Due to the grid-frequency-independent operation of the gas turbine, the speed results in a new additional control parameter for optimizing the power plant operation. Among other things, this allows:

stable grid-frequency-independent operation of the gas turbine, grid-frequency-independent power control of the power plant, grid-frequency-independent efficiency optimization of the power plant, grid-frequency-independent part-load optimization of the power plant, improved emission control of the gas turbine.

The grid-frequency-independent operation of the gas turbine also provides for better optimization of the design of the power plant. This allows, for example, to design the compressor and turbines for the optimum point which is not possible with fixed frequency coupling, a cost-optimized design of the gas turbine corresponding to its power which is not possible with a restriction to a fixed 50 Hz or 60 Hz grid frequency due to the predetermined speed and aerodynamic or mechanical design limits, better matching of compressor and turbine, optimum matching to variable environmental conditions.

Apart from the better design, the grid-frequency-independent operation of the gas turbine, due to a slow design speed or design frequency, also allows the gas turbine to be enlarged. Corresponding to the usual scaling between 60 Hz and 50 Hz, the size and power of the gas turbine can be scaled further by reducing the design speed to below 50 Hz. Size and power are inversely proportional to the square of the speed.

The grid-frequency-independent operation of the gas turbine allows not only operation of the gas turbine nearer its optimum level independently of the ambient boundary conditions, but also allows reducing the variations of exhaust gas mass flow and exhaust gas temperature. This means that the boundary conditions for the at least one boiler, and thus for the at least one steam turbine fed by this boiler, can be better controlled. Due to these better control possibilities, the additional potential for improvement by controlling the speed of the steam turbine is greatly reduced.

Moreover, compared with the very expensive development of a gas turbine which cannot be simply geometrically scaled in all parts such as, e.g., the combustion chambers, the development of a steam turbine for different speeds is relatively unproblematic and advantageous. Developing a gas turbine becomes very expensive due to restricted scalability and the high complexity of the integration, particularly the integration of the compressor, combustion chamber and turbine. Furthermore, the potential for savings in production due to an increased number of items when one type can be sold for the 50 Hz and 60 Hz market is distinctly higher for complex gas turbines than for steam turbines. Improved operating characteristics, the possibility of a more optimized design and the savings predominate on the gas turbine side compared with the additional costs and power and efficiency losses which accumulate for the electronic decoupling. In contrast, the possible savings in the case of a water/steam cycle following a speed-controlled gas turbine are distinctly less and the potential additional gain in the operating characteristics and in the design is very small. In this context, the specific costs and the relative power and efficiency losses which accumulate for the electronic decoupling of the steam turbine are of the same order of magnitude as for a gas turbine. Due to the shift in the cost/benefit ratio, electronic decoupling of the steam turbine is not used in the present invention and a method for operating a corresponding combined-cycle power plant and the associated power plant is proposed.

According to one embodiment of the invention, the operating frequency of the gas turbine differs distinctly from the grid frequency wherein, in particular, the operating frequency is lower than the grid frequency and the grid frequency is 50 Hz or 60 Hz. In a preferred embodiment, the grid frequency is 60 Hz and the operating frequency is about 50 Hz.

However, the operating frequency of the gas turbine can also be greater than the grid frequency which is preferably 50 Hz or 60 Hz. In particular, the grid frequency can be 50 Hz and the operating frequency can be about 60 Hz.

Another embodiment of the invention comprises a matrix converter with a plurality of controllable bidirectional switches arranged in an (m×n) matrix, which switches, controlled by a controller, optionally connect m inputs to n outputs, where m is greater than n, and wherein first means for determining the signs of the currents in the inputs and second means for determining the signs of the voltages between the inputs are provided, and wherein the first and second means are actively connected to the controller. Bidirectional switches can be formed of one component or can also be composed of several components. For example, two anti-parallel thyristors with opposite turn-on directions can be used as controllable bidirectional switches. The means for determining the signs of the currents and voltage can be, for example, current or voltage meters. As an alternative, binary transmitters which only output the sign can also be used, for example.

According to a further embodiment of the invention, the frequency converter is used as a variable electronic gear unit. This makes it possible to implement a reliable speed control of a gas turbine connected to the power grid. This variable electronic gear unit can be implemented, for example, by a matrix converter.

The speed is controlled by the nominal speed (speed set point or target speed) being transmitted to the variable electronic gear unit and the speed being forced onto the gas turbine via the generator. In this arrangement, the generator is referenced to the power grid, which is virtually static in comparison with the gas turbine, via the variable electronic gear unit and, by controlling the frequency ratio between mechanical speed and grid frequency, forces the nominal speed onto the gas turbine.

According to one embodiment of the invention, the transmission ratio of gas turbine speed to grid frequency of the variable electronic gear unit is less than one. In particular, it is, for example, five sixths.

However, the transmission ratio of gas turbine speed to grid frequency of the variable electronic gear unit can also be greater than one. In particular, it is, for example, six fifths.

A further embodiment allows flexible speed control around a design transmission ratio.

The nominal speed of the gas turbine is determined in dependence on the design and the operating conditions of the gas turbine. This can be done, for example, in the control arrangement of the gas turbine from which the nominal speed is transferred to the controller of the variable gear unit. Determination of the nominal speed is also conceivable in a separate controller or in a higher-level so-called unit controller which coordinates the control of the gas turbine and steam turbine in a combined-cycle power plant.

Due to the fact that the course of the gas turbine characteristics is much flatter with the control of the speed and the few changes in the boundary conditions for the water/steam cycle, the characteristics of the entire combined-cycle power plant become much flatter. This means that the changes in power and efficiency of the power plant are smaller than in conventional power plants when the operating conditions deviate from the design conditions. In particular, reductions in power and efficiency at high ambient temperatures, which represent the critical operating case for many electrical power grids and in which the prices which can be achieved for power are typically the highest, are distinctly reduced.

A further embodiment of the invention is distinguished by a power plant which is already optimized in its design for operating with a gas turbine decoupled electronically from the power grid. As a primary consideration, the design of the gas turbine can be optimized for operation independent of the grid frequency. Moreover, the water/steam cycle can be optimized better for design operation in the combination with a speed-controlled gas turbine in accordance with the reduced variations of boundary conditions described above and the safety margins to be taken into consideration in the design can be reduced. As a consequence, the design efficiency and the design power of the water/steam cycle can be improved.

According to one embodiment of the invention, the power plant comprises at least one power train having at least one steam turbine and a second AC generator directly driven by the at least one steam turbine, at least one power train having at least one gas turbine and a first AC generator with an operating frequency driven directly by the at least one gas turbine, a frequency converter arranged between the first AC generator and the power grid, wherein the second AC generator is coupled directly with respect to frequency to said power grid, and wherein the frequency converter comprises at least one matrix converter; and current delivered to the power grid is smoothed by superimposing current generated by the at least one first AC generator.

A further embodiment having a particularly high efficiency and low emission values is characterized by the fact that the gas turbine is constructed as a gas turbine with sequential combustion.

According to further embodiments of the invention, the possibilities arising from detaching the gas turbine from the power grid with respect to frequency are utilized not only for steady-state load operation but also for improving transient operation. Particular advantages are obtained by grid-frequency-independent control in the case of under-frequency or over-frequency events.

Due to this concept, improvements in the operating behavior and use of service life of the gas turbine are achieved in the following points:

In the case of under-frequency, the power plant normally first loses power; the power plant can only support the power grid actively by means of additional power after the reduced power has been compensated for by corresponding correction. In the case of over-frequency, conversely, the power plant first increases power; the power plant can only support the power grid actively by reducing power after compensating for the additional power by corresponding correction.

These delays do not occur with plants embodying principles of the present invention and the power plant can immediately apply load from the current load point and support the frequency. In this context, either the speed can be kept constant and the delivery or acceptance of dynamic power from the power train of the gas turbine may be omitted or the speed of the power train can be varied in a controlled manner. Controlling the speed controls the changes in operating conditions of the gas turbine and enables other control parameters of the gas turbine to be feed forward controlled.

Reduction of the transients in the case of frequency fluctuations:
  in the case of under-frequency, the suction mass flow is first of all reduced; this leads to over-firing (with a fuel mass flow which is constant) and shortly thereafter, as a rule, to under-firing due to controller intervention.
  analogously, under-firing occurs in the case of over-frequency, followed by overfiring.
  these transients are avoided with the new grid-frequency-independent operating principles of the present invention, or mitigated by feed forward control, and thus the use of service life is reduced and emissions are avoided which mandatorily occur in the case of transient operation beyond the design speed (NOx in the case of over-firing and CO in the case of under-firing).

The subject matter of the following embodiments are aspects in the method for operating the combined-cycle power plant which optimize the control in the case of short-term and longer-lasting under- or over-frequency events. Short-term grid frequency changes are here understood to be changes in the grid frequency which occur within a few seconds or a few dozen seconds as are caused, for example, by a power plant tripping or adding a large load. In this context, as a rule, short-term changes are understood to be periods of a few seconds up to about 30 s. However, these can also last up to several minutes and occur in steps when, for example, one power plant fails first and, due to the drop in the grid frequency, a second power plant fails with delay. These are in contrast to longer-lasting changes in the grid frequency in the case of which the grid frequency is operated at reduced frequency over a relatively long period. As a rule, longer-lasting changes are understood to be periods of over 30 s. However, these can also last up to several minutes and even up to hours in special cases. In this context, short-term grid frequency changes can be followed by longer-lasting changes in the grid frequency.

For longer-lasting frequency changes, the task is to avoid transients of the gas turbine and an associated rise in emissions and to affect an increased service life of the plant components.

An important factor of this part-aspect of the method according to the invention is that, in the case of longer-lasting changes in the grid frequency, the mechanical or aerodynamic speed of the gas turbine is kept constant and the power of the gas turbine is adapted without delay. Correspondingly, speed-related changes in the exhaust gas mass flow are avoided and energy from the exhaust gases available to the water/steam cycle changes in proportion to the power adaptation of the gas turbine. The steam turbine power can thus be kept constant in a first approximation or, respectively, changes in proportion to the power adaptation of the gas turbine without requiring the speed of the steam turbine to be controlled.

For short-term or fast frequency changes, the task is to create a method which provides for a fast response to over- or under-frequency events in the power grid and which at the same time largely avoids or limits unwanted transients in the power plant.

Another important factor of this part-aspect of the method according to the invention is that, when short-term over- or under-frequency events occur in the power grid, the mechanical speed of the gas turbine can be controlled independently of the grid frequency. In the case of under-frequency of the power grid, the speed of the gas turbine can be lowered to a greater or lesser extent than the grid frequency and, in the case of an over-frequency of the power grid, it can be raised to a greater or lesser extent than the grid frequency. As a result, the support of the frequency by releasing or absorbing rotational energy from the shaft assembly of the gas turbine is increased.

According to one embodiment of the invention, the decrease or increase in speed of the gas turbine is carried out in a controlled manner. Since the decrease in speed is controlled, the transient overshoots and undershoots in the hot gas temperature can be minimized by suitable feed forward control.

According to principles of the present invention, in the case of a short-term over-frequency or under-frequency event in the power grid, the mechanical speed is not largely kept constant, but rather the plant is run as follows:
  i. in the case of an under-frequency event, the shaft assembly of a gas turbine and first generator is decreased more than the grid frequency via the frequency transmission. Due to the greater decrease in mechanical speed, the frequency support is increased by releasing the rotational energy. Since the decrease in speed is controlled in this case, the transient overshoots and undershoots in the hot gas temperature can be minimized by suitable feed forward control.
  ii. Analogously, in the case of an over-frequency event of the power grid, the mechanical speed of the gas turbine can be increased more than the grid frequency. Due to the greater increase in the mechanical speed, the frequency support is increased by absorbing rotational energy in the shaft assembly. In this case, too, the transient overshoots and undershoots in the hot gas temperature can be minimized by suitable feed forward control.

BRIEF DESCRIPTION OF THE DRAWINGS

In the text which follows, the invention will be explained in greater detail in conjunction with the drawing and with reference to exemplary embodiments.

DETAILED DESCRIPTION OF EXEMPLARY EMBODIMENTS

Figure 1:
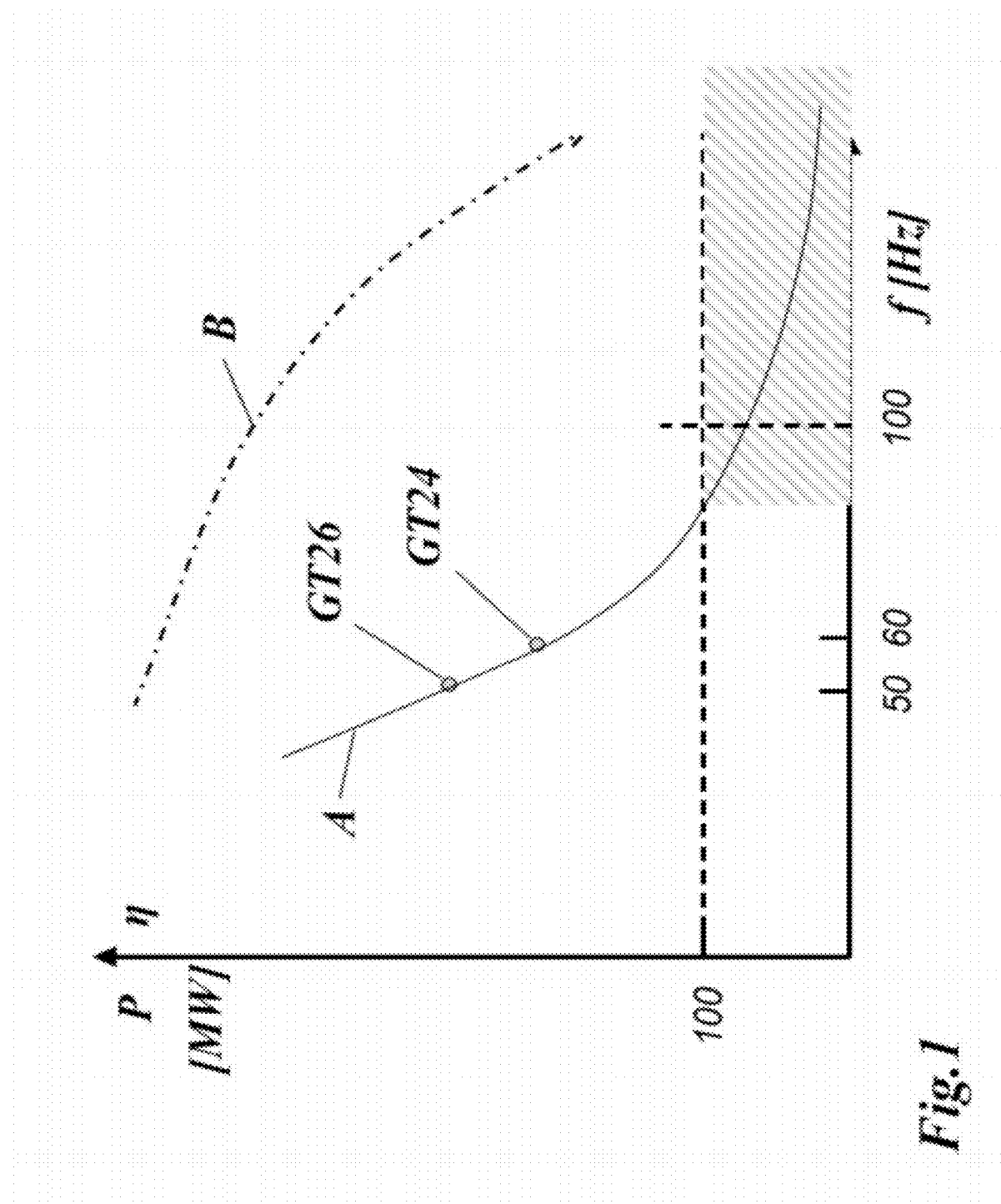
FIG. 1 shows in a diagram the dependency of the possible power (curve A) and of the efficiency (curve B) of a gas turbine on the operating frequency.
Figure 2:
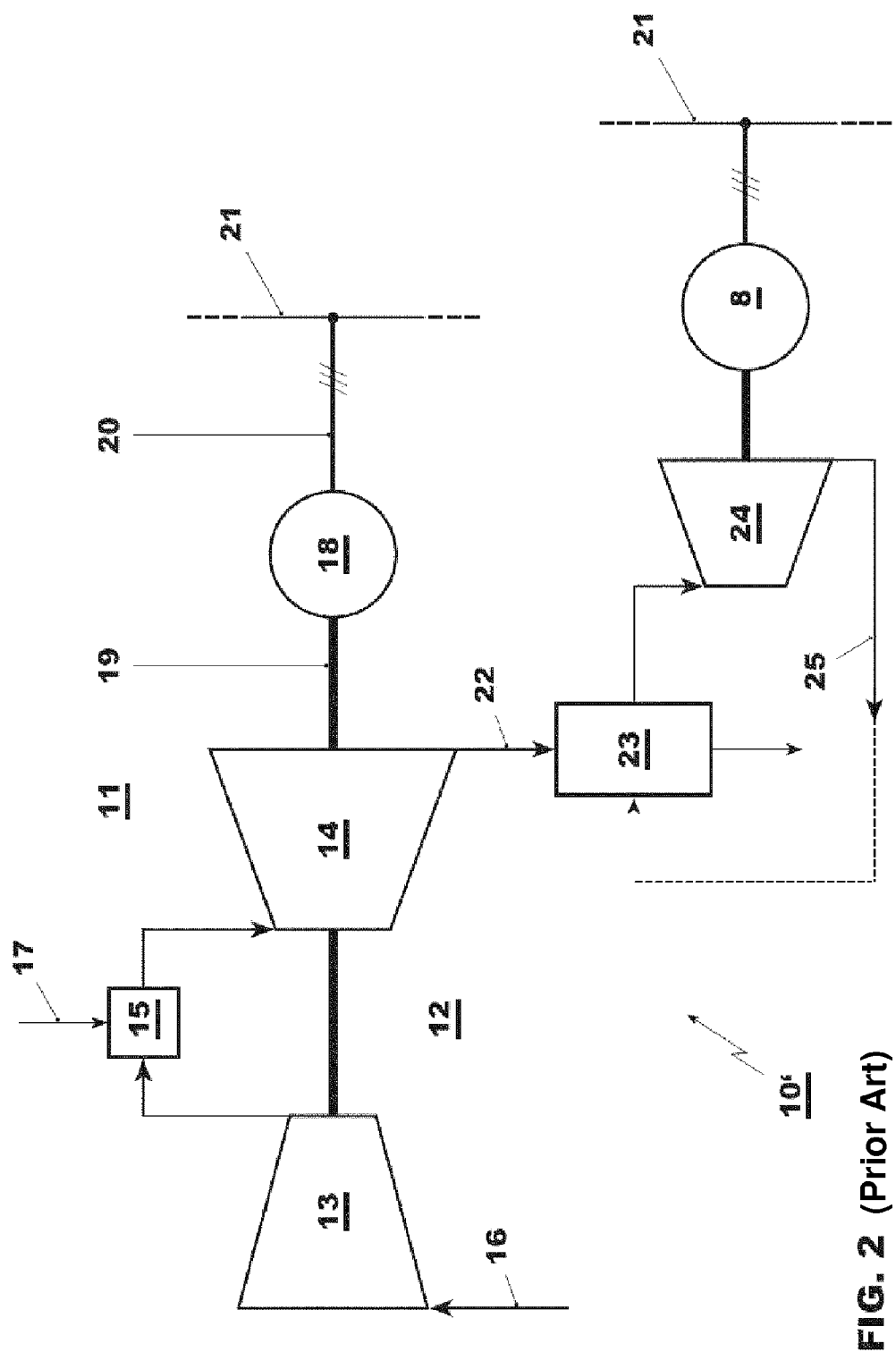
FIG. 2 shows a greatly simplified schematic diagram of a combined-cycle power plant with gas turbine and steam turbine according to the prior art.
Figure 3:
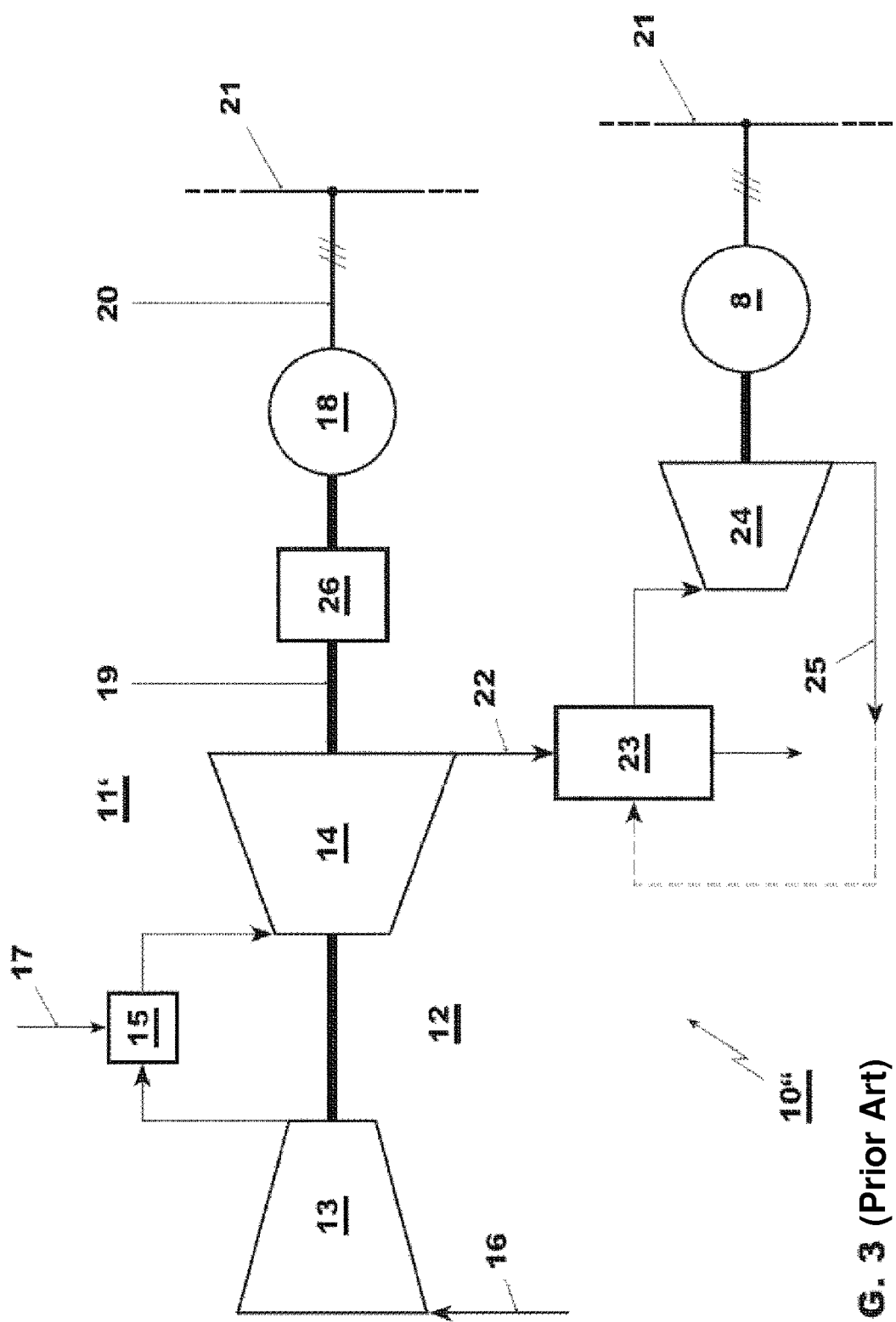
FIG. 3 shows a greatly simplified schematic diagram of a combined-cycle power plant with gas turbine and a mechanical gear unit and steam turbine according to the prior art.
Figure 4:
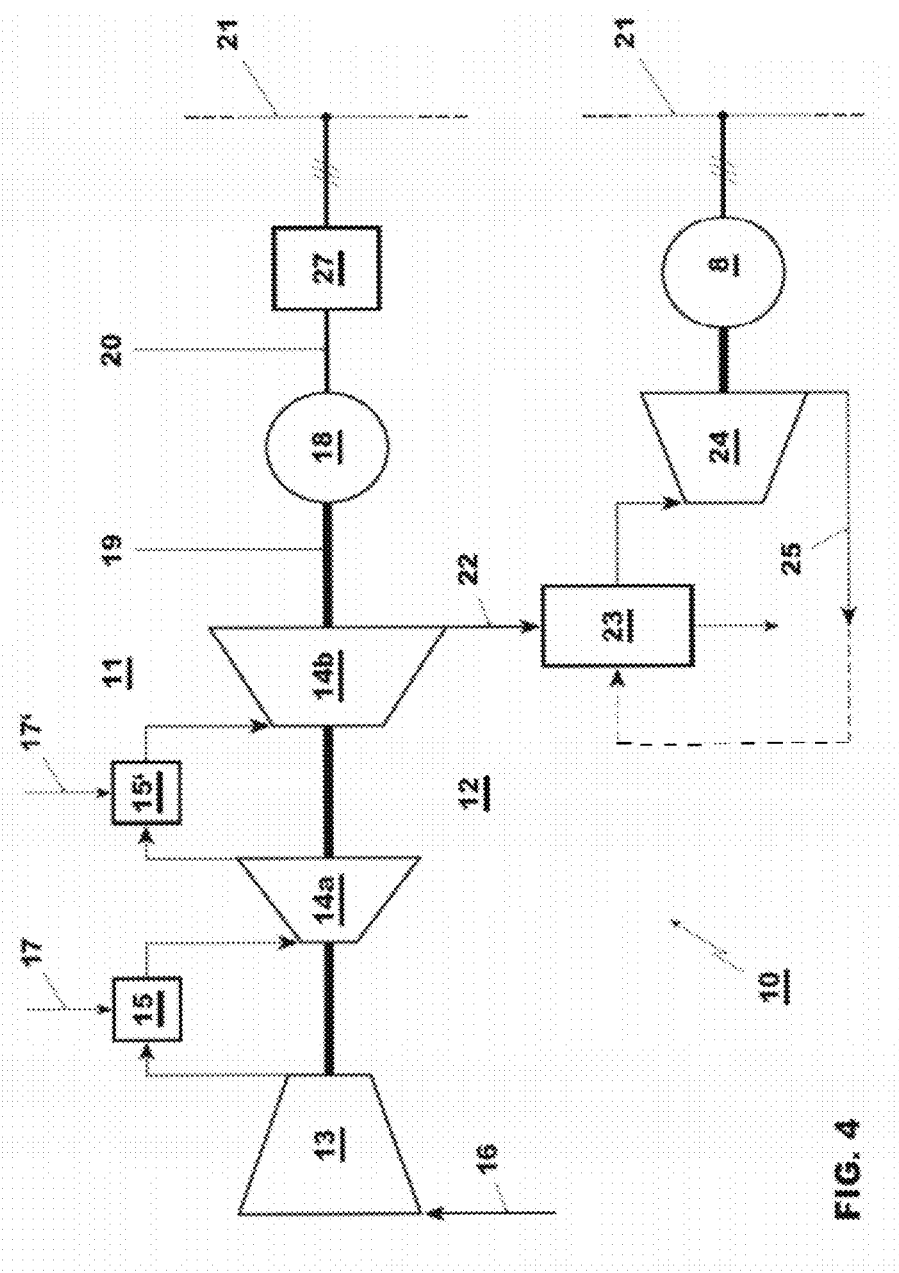
FIG. 4 shows a greatly simplified schematic diagram of a combined-cycle power plant with gas turbine and an electronic decoupling device and steam turbine according to an exemplary embodiment of the invention.

In FIG. 4, a greatly simplified schematic diagram of a combined-cycle power plant with gas turbine and an electronic decoupling device and a steam turbine according to one exemplary embodiment of the invention is reproduced. The power plant 10 includes a gas turbine 12 with a compressor 13 and sequential combustion in which a first combustion chamber 15 generates hot gas with a first fuel via a first fuel supply 17, which hot gas is expanded in a first turbine 14a, then conducted into a second combustion chamber 15' where it produces a second increase in the temperature of the hot gas with a second fuel via a second fuel supply 17', the hot gas then being expanded in the second turbine 14b. Instead of the sequential combustion, which is particularly advantageous with regard to the efficiency, however, a single-stage combustion can also be provided. The remaining parts of the power plant 10 correspond to the parts having the same reference symbol in FIG. 2 or FIG. 3.

The first generator 18 is coupled directly to the shaft 19 of the gas turbine 12. The first generator 18 thus rotates at the same speed as the gas turbine 12. Between the output of the first generator 18 and the power grid 21, is now arranged, however, an electronic decoupling device or a variable electronic gear unit 27, which effects decoupling of the operating frequency generated in the first generator 18 or of the speed of the gas turbine 12 from the predetermined grid frequency of the power grid and allows control of the mechanical speed $n_{mech}$ of the gas turbine 12.

The exhaust gas, which is still relatively hot when it emerges from the gas turbine, is conducted through a subsequent heat recovery steam generator 23 in order to generate steam for the operation of a steam turbine 24 in a separate water/steam cycle 25. The second generator 8 is mechanically coupled directly to the shaft 19 of the steam turbine 24 and coupled electrically directly to the grid frequency. To simplify the representation, condenser, feedwater pump and other systems of the water/steam cycle 25 are not shown.

Figure 5:
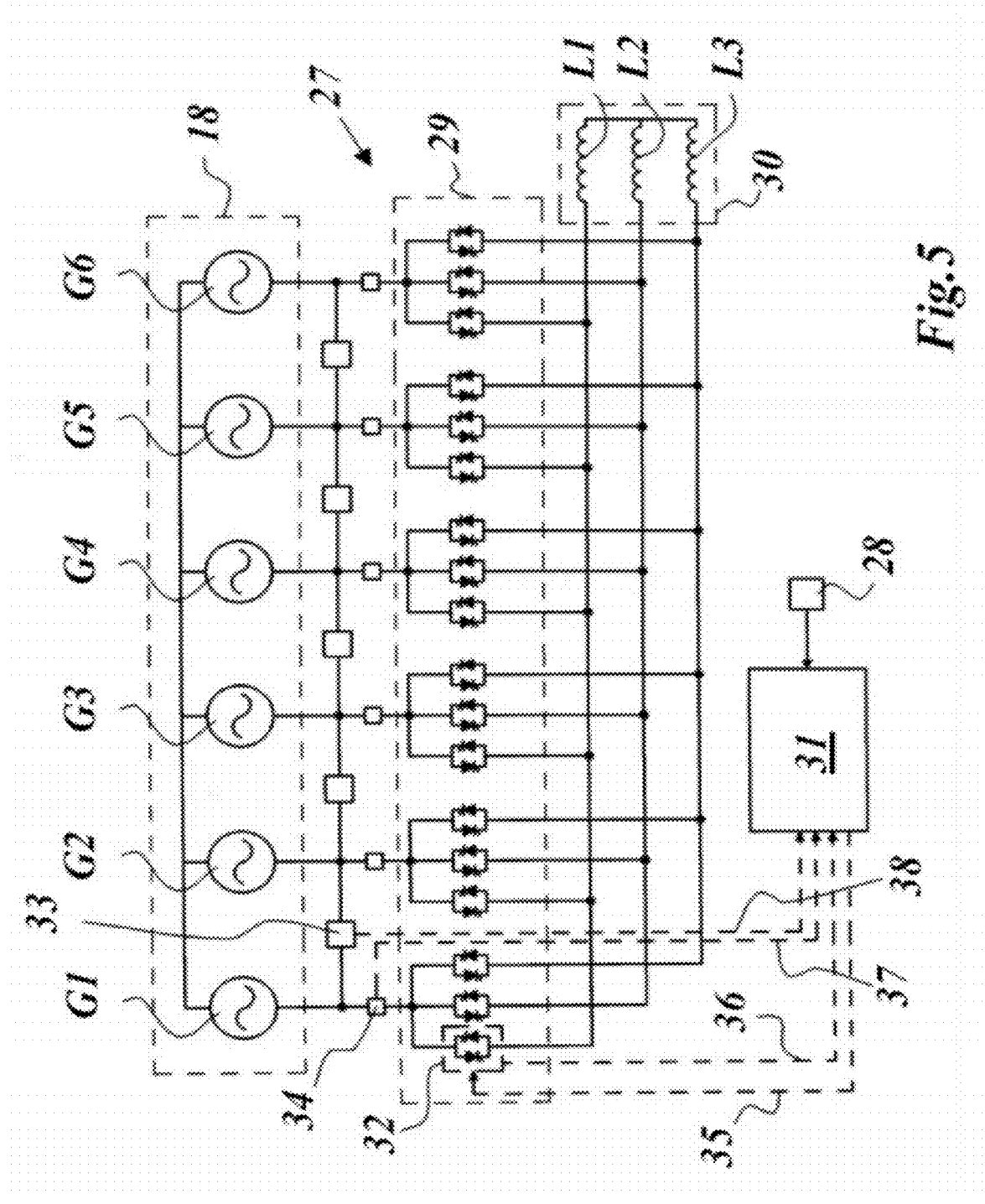
FIG. 5 shows the exemplary internal structure of a matrix converter as can be used as an electronic decoupling device in a plant according to FIG. 4.

To limit power losses, the electronic decoupling device or the variable electronic gear unit 27 is preferably constructed as a matrix converter without a direct-current link circuit. Such a matrix converter, which, due to its drive arrangement, operates with particularly low losses, has been described in its configuration and in its operation in EP-A2-1 199 794. Other remarks about such a matrix converter have been made in EP-A1-1 561 273, in DE-A1-10 2004 016 453, in DE-A1-10 2004 016 463 and in DE-A1-10 2004 016 464. FIG. 5 shows the basic schematic diagram of a matrix converter with six input phases and three output phases. The matrix converter (27) connects six phases G1, ..., G6 of a first generator 18 as source to three phases L1, ..., L3 of a load 30 in a time sequence. The power section 29 needed for this purpose includes 18 bidirectional switches 32 in the form of antiparallel-connected thyristors (in the general case there are m×n switches for m input/source phases and n output/load phases). The switches 32 are arranged in a (6×3) matrix. To drive the switches 32, a controller 31 is provided which receives timing signals (a clock frequency) from a timer 28. The switching state of the switches 32 (ON, OFF) is monitored and in each case reported to the controller 31 via a first signal line 36. The switches 32 are in each case driven by the controller 31 via a control line 35.

In the individual phases G1, ..., G6 of the first generator 18, a current measuring device 34 is in each case arranged, which device reports the sign of the phase current to the controller 31 via a second signal line 37. Furthermore, voltage measuring devices 33 which report the sign of the respective phase difference voltage to the controller 31 via a third signal line 38 are arranged between the phases G1, ..., G6 of the first generator 18. Reference is made to the above-mentioned documents with respect to the details of the operating sequence of the matrix converter.

As an alternative to pure frequency decoupling between the output of the first generator 18 and the power grid 21, the decoupling device 27 can be constructed as a variable electronic gear unit 27 which, in a controlled manner, forces an operating frequency or speed $n_{mech}$, which is independent of the grid frequency F, onto the gas turbine via the first generator 18. The transmission ratio X of the variable electronic gear unit 27 is determined in dependence on the nominal speed 51 and the actual grid frequency F.

The variable electronic gear unit or the decoupling device 27, particularly in the form of a matrix converter of the type described, results in the following advantages:

With rigid frequency coupling, the gas turbine can only be operated with a frequency deviation of up to 5-6% of the grid frequency. This restriction virtually disappears.

The grid frequency of the power grid can be supported within a wide grid frequency range. Whereas a grid frequency support within a range of 5-6% of the grid frequency can be achieved with rigid frequency coupling, support within the region of distinctly more than 10% can be achieved by the electronic decoupling or control of the frequency ratio of the electronic variable gear unit.

The operating optima (power, efficiency), can be adapted in dependence on the environmental conditions (e.g., the inlet temperature).

The power can be increased.

The efficiency can be improved.

The flexibility in the case of load fluctuations and the service life of the turbine can be improved. The turbine can continue to run at constant speed. Additional thermal or mechanical loads, which were necessary due to measures for supporting the speed and which previously occurred, disappear or are reduced.

The emission values can be improved. The additional degree of freedom of a variable speed allows a desired power to be approached at a higher or lower speed. In the case of a gas turbine as drive unit, this is associated with lower or higher turbine inlet temperatures with the effect of influencing the emissions of $CO_2$ and NOx. In particular, it is possible to avoid increased emissions in the case of frequency support.

Frequency decoupling or variable frequency ratios allow power plants to be built in which the constructional size can be minimized for a desired power due to the additional degree of freedom that the speed can be set independently of the grid-frequency, (e.g., a turbine with 3300 rpm has a distinctly smaller constructional size than a turbine with 3000 rpm). This also makes it possible to reduce the construction costs.

Frequency decoupling or variable frequency ratios allows power plants to be built in power ranges which until now have not been achievable with comparable drive technology (e.g., in the case of a turbine with 2400 rpm, an increase in power of approx. 60% is possible compared with an existing turbine with 3000 rpm)

Operating a gas turbine independently of the grid frequency or operating frequency of the load enables the design to be further optimized since conventional gas turbine designs require considerable margins for off-design operation. The main advantages include:

A reduced mechanical speed $n_{mech}$ at low ambient temperatures $T_{amb}$ results in a low compressor discharge pressure with optimum component efficiency and no displacement of the pressure variation (pressure ratios) in the compressor and turbine:

The housing design, the cooling air cooler and the external lines are optimized with reduced margins for extreme $T_{amb}$.

The maximum fuel pressure is reduced. Correspondingly, the design margins for the fuel distribution system (FDS) and the demands on a compressor for gaseous fuel are reduced.

From a constant reduced speed, identical speed triangles follow at the compressor and turbine outlet (at basic load). This results in better diffusers optimized for design. There is no displacement in the pressure build-up in the compressor. The pressure ratios for the cooling air supply are no longer dependent (or are dependent to a lesser degree) on the ambient temperature $T_{amb}$. There is no need to incorporate any, or reduced, margins in the cooling air pressure ratios for variations in $T_{amb}$ in the cooling air system. Correspondingly, it is possible to optimize to design conditions so that a better efficiency and a higher power of the gas turbine is obtained:

This additionally improves the correction curve over $T_{amb}$; at a high $T_{amb}$, in particular, unnecessary amounts of cooling air are not consumed.

The variation of the axial thrust over $T_{amb}$ is smaller. A smaller axial bearing is sufficient. This leads to cost savings and also to lower power losses of the bearing (smaller lubricant oil system). This, too, results in an improvement of power and efficiency.

Figure 7:
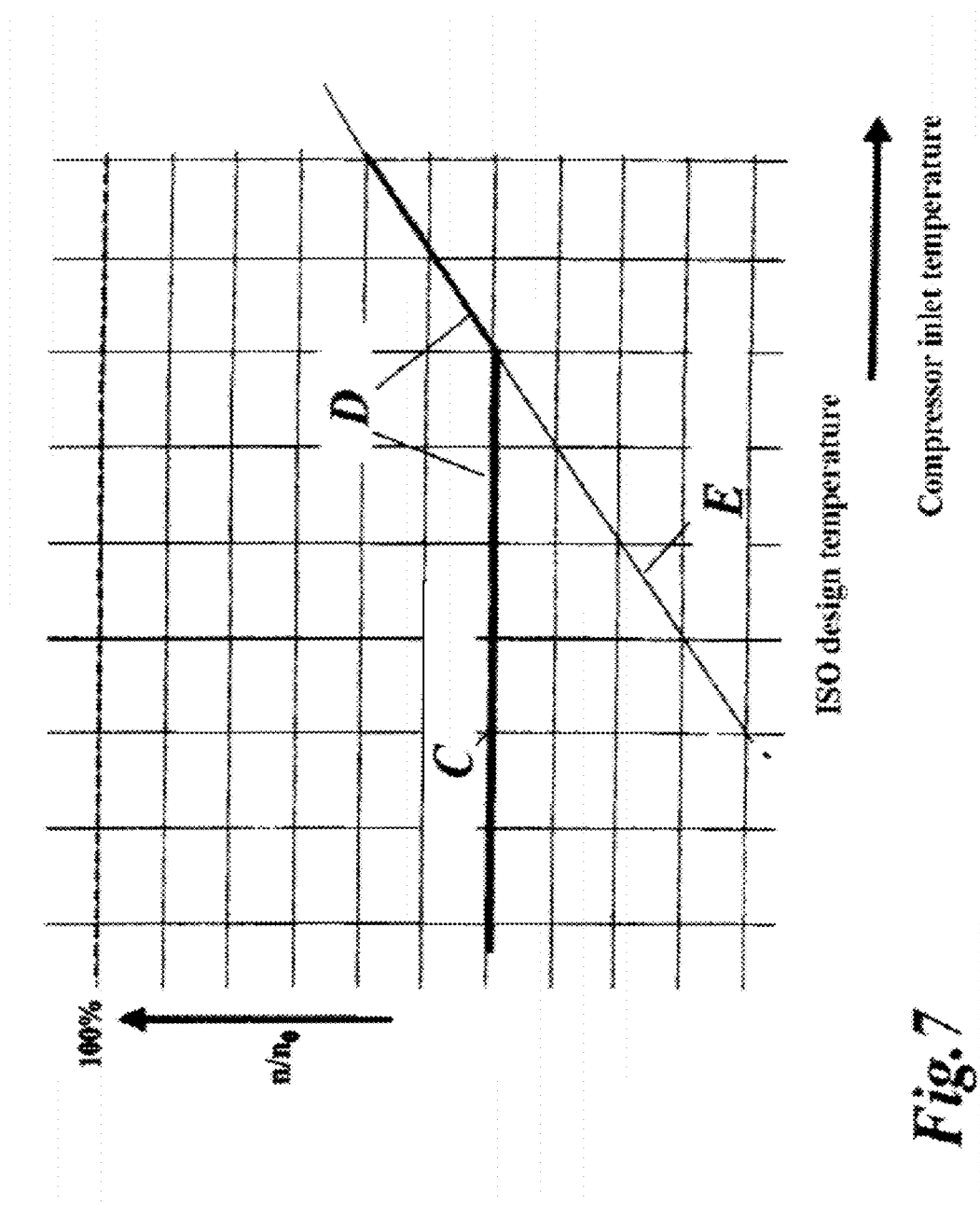
FIG. 7 shows the dependency of a lower speed limit on the compressor inlet temperature.

The primary possibility, according to principles of the present invention, of being able to operate a power train—turbine and generator—within a power plant independently of the grid frequency in a stable manner at a desired speed supports the stabilization of power grids. In the case of frequency drops, the power plant must be capable of maintaining the power delivered at normal grid frequency, ideally even delivering an increased power to the power grid. Up to now power plant systems can guarantee this only to a limited extent. The drop in grid frequency is sensed by a system coupled solidly to the grid frequency as an unwanted drop in speed on the turbine and the generator. After a short phase during which kinetic energy is fed into the power grid from the gas turbine/generator power train due to the deceleration, the delivered power drops. In this case, a gas turbine system responds with a reduced suction mass flow and distinctly increased fuel supply which leads to an increased hot gas temperature within the turbine. This, in turn, considerably reduces the service life of the turbine which increases the operating costs of the plant. The emission of pollutants in the form of NOx is also distinctly increased in this operating phase. This already defines two limits which greatly restrict an increase in power in the case of a drop in grid frequency—service life and emissions. As a third aspect, the mechanical and aerodynamic compatibility plays a role. Severe frequency drops of above 6% lead to power plants being switched off since they are mechanically incapable of being able to be operated at correspondingly reduced speeds. At a lower aerodynamic speed $$n^* = n_{mech} \frac{1}{\sqrt{kT}}.$$

operation is restricted further by the surge limit of the compressor (see FIG. 7; C=mechanical speed limit, D=load shedding, and E=compressor surge protection).

All the disadvantages described above disappear in the case of a grid-frequency-decoupled system or of a system having a controllable frequency ratio. There is no restriction with respect to minimum permissible grid frequencies since the power train does not have to follow the grid frequency. In consequence, there are also no increases in pollutants and penalties in the service life.

Apart from the power grid stabilization, such a power plant system also allows the power or efficiency to be optimized at each operating point, particularly also at part-load operating points. An operating-point-dependent suitable speed control within the framework of permissible mechanical limits results either in a saving in emission and fuel gas due to the increase in turbine efficiency or, as an alternative, an increase in power which enhances the flexibility of a power plant with respect to the covering of peak loads.

A further positive aspect of a grid-frequency-independent power plant system is the better adaptability of a plant to different site conditions. The power grid stability already mentioned is an essential aspect which depends decisively on site. Apart from that, it is especially different ambient conditions such as external temperatures, air pressure, particularly the air pressure due to the altitude of installation, air humidity, and also fuel composition which influence the operating state of a power plant. The additional degree of freedom of independent speed control allows optimized operating conditions to be generated in each case in accordance with the current ambient conditions. At the same time, improvements in efficiency or also increases in power are possible.

For example, to simplify, the mechanical speed can be controlled inversely proportionally to the compressor inlet temperature in order to keep the aerodynamic speed of the gas turbine constant. Starting from a reference speed, the nominal speed of the gas turbine is controlled proportionally to the root of the compressor inlet temperature.

Furthermore, for example, a correction of the reference speed in dependence on the fuel gas used may be advantageous. Starting from a gas turbine design, for example for ISO methane, the fuel gas volume flow will increase with a decreasing specific heating value of the fuel gas and thus the combustion chamber pressure and compressor discharge pressure will increase. To compensate for this, a reduction in the reference speed inversely proportionally to the heating value of the fuel gas is proposed. This becomes relevant, for example, in the combustion of synthetic gases.

The potential of this new technology for improving efficiency with respect to a power production site can be of the order of magnitude of 3% (multiplicatively) in the turbine in a typical application. Increases in power of distinctly more than 10% with respect to a power production site are conceivable. Restrictions in grid frequency become insignificant.

All the aspects listed above can be applied already for existing turbines. In addition, various possibilities of how gas turbines can be optimized come to light if the speed of the gas turbine is unlimited by the grid frequency.

The turbine components, compressor and turbine can be designed with new boundary conditions. Previously, it has been necessary even in the case of steady-state gas turbines to take into consideration a minimum operating range of approx. +/−10% of reduced speed as a safety window on the basis of design conditions. This ensures that the gas turbine can sustain both mechanical speed fluctuations caused by grid frequency fluctuations and changes in the inlet temperature which enter into the reduced speed at a ratio of $1/(T_{k1})^{1/2}$. The design conditions selected are typically ISO conditions, i.e., ambient conditions at 15° C., 60% relative air humidity and 1013 mbar. If the reduced speed range needed is restricted by an optimized operating concept, a gain in efficiency as well as in power can be achieved by a new design of the compressor and turbine blading.

In a conventional combined-cycle power plant, the exhaust gas mass flow at full load varies greatly depending on compressor characteristics and ambient boundary conditions. If, for example, the compressor inlet temperature is 30 K lower than for the design point of the power plant on the coldest day for which unrestricted operation must be guaranteed, an exhaust gas mass flow increased by about 10% compared with the full load design point must be expected for this coldest day at full load and the water/steam cycle must be correspondingly designed. As a consequence of the restricted reduced speed range in which the gas turbine is operated in accordance with the methods described above, variations in the full-load exhaust gas mass flow can be reduced by up to one dimension or avoided entirely. Depending on the design of the gas turbine, limits can be set on the speed control of the gas turbine by limits on the mechanical speed. Correspondingly, variations in the exhaust gas mass flow can then not be avoided and, for example, the water/steam cycle must be designed for variations in the exhaust gas mass flow of plus/minus 5%.

A further alternative of utilizing the flexibility with respect to the grid frequency lies in the possibility of developing gas turbines and generators in speed ranges which could previously not be achieved. Thus, larger power plant units can be implemented by lowering the speed with respect to the grid frequency, e.g., to 45 Hz.

Within the speed range where gas turbines can no longer be equipped with gear units but which is still above the grid frequency, the possibility of building more compact and thus more cost-effective gas turbines is obtained if the power is below the limit power at the given grid frequency. The generator also has the advantage that it can be built to be more compact due to a higher speed.

As a further option in the area of modern turbines with gear units, the possibility of dispensing with the gear unit and designing the generator for the turbine speed is obtained. In this case, too, the generator becomes smaller and more advantageous.

Figure 6:
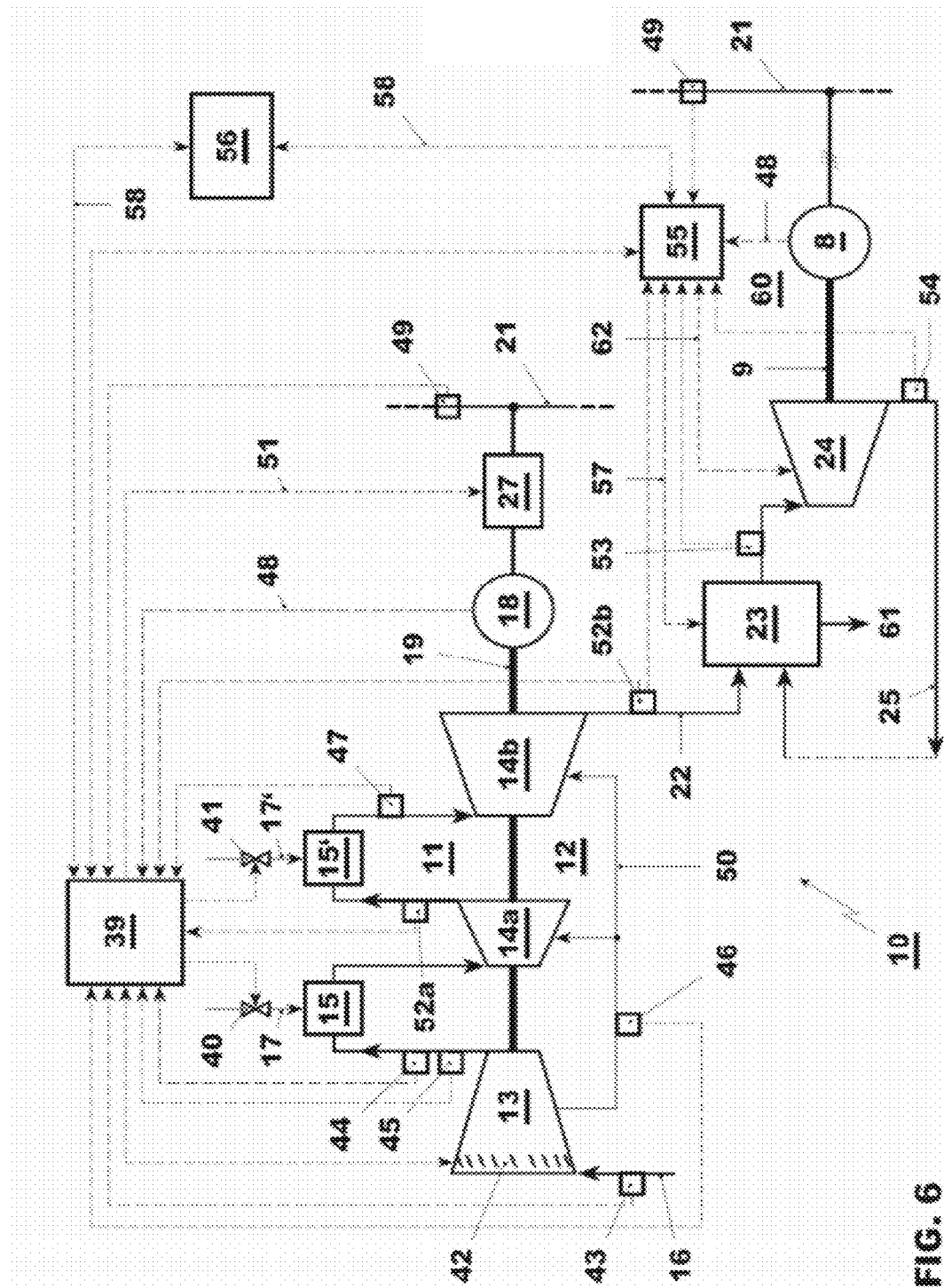
FIG. 6 shows a plant comparable to FIG. 4 with various possibilities of control according to the invention.

FIG. 6 shows a simplified arrangement of a combined-cycle power plant, power plant 10, which is designed for an operating method according to principles of the present invention. The power train 11 with the gas turbine 12 and the first generator 18 and the power train 60 of the steam turbine 24 correspond to those in FIG. 4. This also applies to the variable electronic gear unit or the electronic decoupling device 27 and the connected power grid 21. The power grid 21 can be a general power supply system but also a traction system. Instead of the power grid 21, a load, e.g., an industrial drive unit or a compressor for a natural-gas liquefaction plant can also be connected. The power grid 21 or the load to which the second generator 8 of the steam turbine 24 is connected can be another power grid 21 or another load than the one to which the first generator 18 of the gas turbine 12 is connected. The representation of condenser, feed water pumps and other systems of the water/steam cycle 25 has been omitted here for reasons of space.

At least one row of adjustable compressor blades 42 at the input of the compressor 13 and control valves 40 and 41 in the fuel feed 17 or 17' to the combustion chambers 15, 15' is used for controlling the gas turbine 12. The corresponding control signals come from a controller 39 as determined by certain input parameters which can be used individually or in any desired combination. One possible parameter is the compressor inlet temperature which is measured with a sensor 43 arranged at the air inlet 16. Other possible parameters are the final compressor temperature and the compressor discharge pressure which are measured with a second and third sensor 44 and 45 at the compressor outlet. A further sensor 46 which is arranged at a cooling air supply 50 from the compressor 13 to thermally loaded components of the gas turbine 12, for example in the two turbines 14a and 14b, measures the pressure and/or the temperature and/or the flow rate of the cooling air. A further sensor 47 can be arranged at the second combustion chamber 15' in order to measure the pressure in this combustion chamber. The outlet temperatures of the first and second turbines 14a, 14b can be measured via the sensors 52a, b. The speed of the gas turbine 12 can be picked up, for example, at the first generator 18 and input into the controller 39 via a instrument lead 48. To measure the grid frequency in the power grid 21, a grid frequency pick-up 49 can be provided. Finally, a value for a target power ZL can be input into the controller 39.

In the case of electronic decoupling from the power grid, the controller 39 controls the aerodynamic or mechanical speed $n_{mech}$ of the gas turbine 12 and of the first generator 18 in accordance with one or more of these parameters without the speed being influenced by the grid frequency F of the power grid 21.

As an alternative, the speed can also be controlled, for example, by transferring the nominal speed 51 calculated in the controller 39 of the gas turbine to the controller 31 of the variable electronic gear unit 27 and forcing the nominal speed 51 onto the gas turbine 12 via the generator. In this arrangement, the first generator 18 is rigidly connected to the power grid 21, which is virtually static in comparison with the gas turbine 12, via the variable electronic gear unit 27 and by controlling the frequency ratio between the grid frequency F and mechanical speed $n_{mech}$ forces the nominal speed 51 onto the gas turbine. In this context, virtually static power grid 21 means that changes in the grid frequency F due to a change in the speed $n_{mech}$ or in the power delivered to the power grid 21 by the relevant gas turbine 12 are very small and can be disregarded or can be easily compensated for in the control process. In particular, this means that in the case of a forced-on adaptation of the gas turbine speed, any change in the grid frequency F which may result is one order of magnitude smaller. As a rule, the resultant change in the grid frequency F will not be measurable, or measurable only with difficulty, in the noise of the power grid.

In the present example, the water/steam cycle 25 is controlled by a water/steam cycle controller 55. Just like the controller 39 of the gas turbine 12, it receives its control signals from the unit controller 56 and exchanges signals with the latter via the signal lines 58. All operating states such as temperatures, mass flows or positions of valves and pressures of the boiler required for controlling the boiler 23 are transmitted to the water/steam cycle controller 55, via the signal lines 57 and it sends the control signals to the boiler 23 via lines 57. As a further input variable, the outlet temperature 52b of the gas turbine 14b can be transmitted directly to the water/steam cycle controller 55. On the basis of the operating states of the steam turbine 24, for which the steam state, i.e., temperature and pressure, before and after the steam turbine 24 via the sensors 53 and 54 is shown here representatively, and its speed 48, the latter is controlled by the water/steam cycle controller 55. The control signals are exchanged via the signal lines 57.

In practice, the water/steam cycle is in most cases not controlled by one water/steam cycle controller 55 but via a series of controllers which communicate with the unit controller 56. For example, these would be a controller for the steam turbine, a controller for the boiler or a controller for the auxiliary system such as condenser and feed water pumps.

FIG. 7 shows, in a simplified manner, the lower limit of the normalized minimum speed of a gas turbine 12 over the compressor inlet temperature $T_{k1}$, which conventionally must be taken into account, and against the undershooting of which the gas turbine 12 is protected by a load shedding D. It is composed of a mechanical speed limit C and a compressor surge protection E.

A further improvement in the flexibility and the operating range of a gas turbine can be achieved in the context of the invention in that the absolute speed range, in which the gas turbine 12 can be operated in a steady state on the power grid 21 can be distinctly extended towards low speeds $n_{mech}$. For steady-state operation, the mechanical speed $n_{mech}$ is limited downward by the excitation of natural frequencies in conventional gas turbines 12. For example, these can be natural frequencies of blades. It is only possible to move in transient fashion through speed ranges in which natural frequencies are excited. This occurs on start-up or turning-off of the gas turbine 12 as long as the latter is not synchronized with the power grid 21. Around speeds $n_{mech}$ which can lead to the excitation of natural frequencies there is a stop band in which the gas turbine 12 cannot be operated in steady-state manner. The topmost stop band below the operating frequency of the gas turbine 12 normally forms the basis for the mechanical speed limit C. Control of the gas turbine speed detached from the grid frequency as described herein also allows transient movement through stop bands during the delivery of power by the gas turbine to the power grid and operation of the gas turbine at a speed $n_{mech}$ below a stop band. During the operation with an electronic decoupling device or a variable electronic gear unit 27, attention must be paid to the fact that the electronic device can exert excitations on the shaft assembly via the first generator 18 at certain frequencies. If these lead to critical natural vibrations in the shaft 19, blades or other components of the shaft assembly, these frequencies must also be avoided. The stop bands can also be incorporated in the control of the gas turbine 39. Since these excitations depend on the electronic device, the stop bands are stored in the controller 31 of the variable electronic gear unit 27 in one embodiment. If the nominal speed 51 falls into such a stop band, it is corrected in the controller 31 to the next higher or next lower value below or above the stop band, respectively, and the variable electronic gear unit is controlled in accordance with the corrected value.

Figure 8:
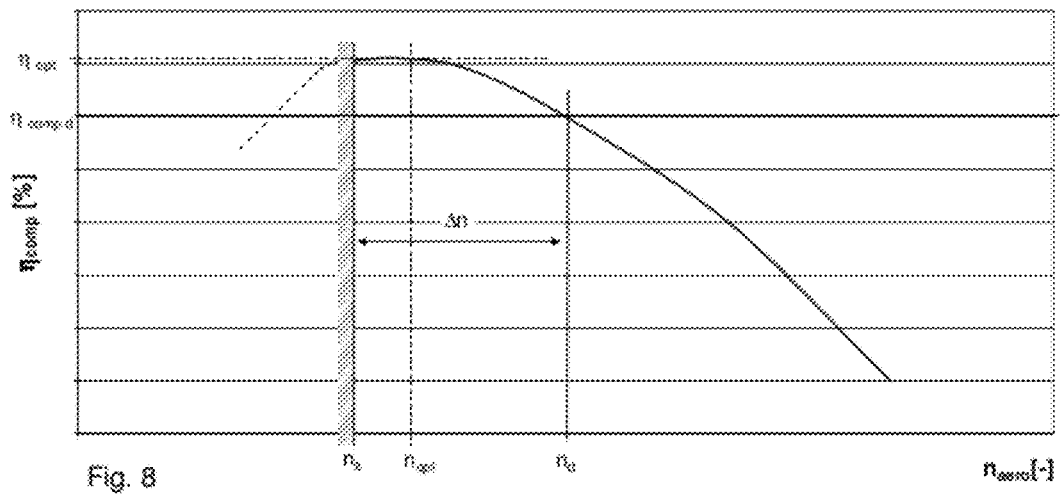
FIG. 8 shows the compressor efficiency in dependence on the aerodynamic speed.

The speed limits to be observed as shown in a simplified manner using the example of load shedding as compressor surge protection E at underspeed in FIG. 7 are a compromise between two opposite demands: on the one hand, the operating range of the gas turbine 12 should be restricted as little as possible and, on the other hand, the compressor 13 should be run as closely to the surge limit as possible because its efficiency is highest there. The influence of the distance $\Delta n$ from the surge limit $n_s$ on the compressor efficiency $\eta_{comp}$ achieved during operation is shown diagrammatically in FIG. 8. The highest compressor efficiency $\eta_{opt}$ is reached at an optimum aerodynamic speed $n_{opt}$ slightly above the surge limit $n_s$. A conventional gas turbine 12 is not operated at this speed under design conditions since the distance $\Delta n_{mech}$ from the surge limit $n_s$ must be maintained. This leads to a lower compressor design efficiency $\eta_{comp\ d}$ at the design speed $n_d$.

Where a gas turbine 12 is newly designed with controllable speed, the compressor 13 can be optimized with a smaller distance $\Delta n$ from the surge limit $n_s$ and designed for operating closer to or at the optimum speed $n_{opt}$ since changes in the aerodynamic speed n* due to changes in the compressor inlet temperature $T_{K1}$ can be compensated for by controlling the mechanical speed $n_{mech}$. In addition, the margin for changes in the grid frequency F can be reduced or dropped completely. This improves the efficiency of the compressor 13 and finally of the entire power plant.

Figure 9:
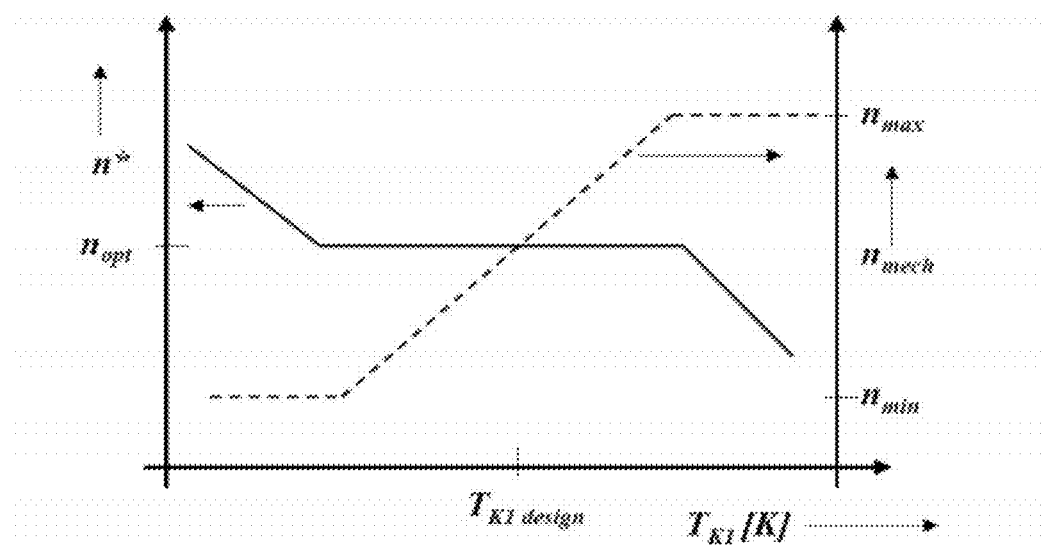
FIG. 9 shows the control of the aerodynamic speed n* and of the mechanical speed $n_{mech}$ over the compressor inlet temperature $T_{K1}$.

A controller 39 in which the mechanical speed $n_{mech}$ is controlled as a function of the compressor inlet temperature $T_{K1}$ is shown in FIG. 9. The mechanical speed $n_{mech}$ is raised proportionally to the compressor inlet temperature $T_{K1}$ in order to keep the aerodynamic speed $$n^* = n_{mech} \frac{1}{\sqrt{T_{k1}}},$$

constant. It is also conceivable that the mechanical speed $n_{mech}$ is controlled or corrected to a constant value as soon as mechanical or other limit values such as, e.g., pressures or temperatures are reached. In actual terms, the mechanical speed $n_{mech}$ is raised with rising compressor inlet temperature $T_{k1}$, starting with the design temperature $T_{K1d}$, at which the optimal aerodynamic speed $n_{opt}$ is reached with a mechanical speed $n_{mech}$, until the upper limit in the mechanical speed $n_{max}$ is reached. Analogously, the mechanical speed $n_{mech}$ is reduced with dropping compressor inlet temperature $T_{k1}$ until the lower limit in the mechanical speed $n_{min}$ is reached. Once the mechanical limit has been reached, the mechanical speed $n_{mech}$ is kept constant in this example.

The inlet temperatures or hot gas temperatures of the turbines 14a, b can be controlled independently of the compressor inlet temperature $T_{k1}$ and the speed. For example, it is controlled to a constant value. In this case, controlling the mechanical speed so that the aerodynamic speed n* of the compressor is kept constant leads to the aerodynamic speed of the turbines 14a, b changing proportionally to the mechanical speed. This also leads to the operating point of the turbine 14a, b becoming displaced and its efficiencies changing. With the efficiencies, the turbine powers and the turbine outlet temperatures 52a, b, the exhaust gas enthalpy and thus the boundary conditions for the subsequent boiler 23 of the water/steam cycle 25 change. In comparison with a conventional gas turbine 12 operated at constant mechanical speed $n_{mech}$, however, the changes in boundary conditions are distinctly reduced. When the compressor inlet temperature $T_{k1}$ changes, the resultant changes in the boundary conditions for the water/steam cycle in a gas turbine controlled to a constant aerodynamic speed n* of the compressor are typically smaller by about one order of magnitude than in the case of a gas turbine operated at constant mechanical speed. Due to the small resultant variation in the boundary conditions for the water/steam cycle, an electronic decoupling or speed control for the steam turbine would not have any significant positive effect so that the losses associated with the electronic decoupling or speed control could not be compensated for.

With respect to the boundary conditions of the water/steam cycle, controlling the gas turbine speed to a constant turbine outlet temperature 52b or constant exhaust gas enthalpy within the framework of the speed limit of the gas turbine is also possible as an alternative to controlling to a constant aerodynamic speed n* of the compressor.

In both cases, the water/steam cycle can be optimized better for design operation and the safety margins to be taken into consideration in the design can be reduced. With a distinctly flatter course of the gas turbine characteristics and the slight changes in the boundary conditions for the water/steam cycle, the characteristics of the entire combined-cycle power plant become distinctly flatter. This means that the changes in power and efficiency of the power plant with deviations in the operating conditions from the design conditions are smaller than in the case of conventional power plants.

Figure 10:
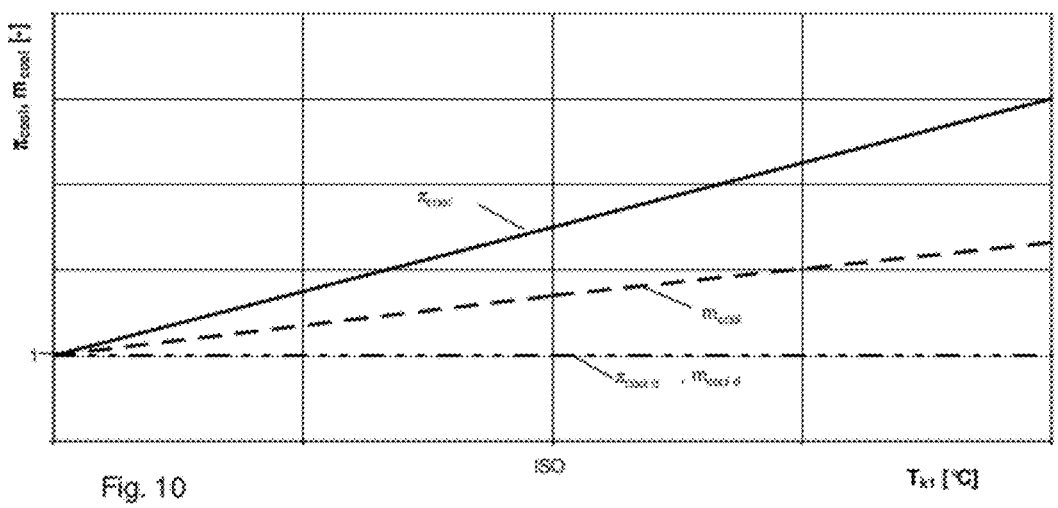
FIG. 10 shows the course of the normalized cooling air pressure ratio $\pi_{cool}$ and of the normalized cooling air mass flow $m_{cool}$ over the compressor inlet temperature $T_{k1}$ for a cooling air system of the gas turbine.

FIG. 10 diagrammatically shows as an example the variation of the normalized cooling air pressure ratio $\pi_{cool}$ and of the normalized cooling air mass flow $m_{cool}$ over compressor inlet temperature $T_{k1}$ for a cooling air system of the gas turbine 12 which is supplied with cooling air 50 from the center part of the compressor. In contrast to cooling air which is taken from the compressor end and which mandatorily is always available at compressor outlet pressure, a constant pressure ratio is not ensured for all operating states when cooling air is taken from the compressor since the pressure buildup in the compressor shifts depending on the operating conditions. This is taken into consideration in the design of the cooling air system so that the minimum cooling air volume $m_{cool\_d}$ required is available at the minimum required cooling air pressure ratios $\pi_{cool}$ in the entire design range.

In the case of conventional gas turbines, the normalized cooling air pressure ratio $\pi_{cool}$ and the normalized cooling air mass flow $m_{cool}$ rises with the compressor inlet temperature $T_{k1}$. This leads to an increased consumption of cooling air $m_{cool}$ even under ISO conditions, which rises further with the compressor inlet temperature and leads to losses in power and efficiency. Raising the mechanical speed $n_{mech}$ makes it possible to reduce the normalized cooling air pressure ratio $\pi_{cool}$ and the resultant normalized cooling air mass flow $m_{cool}$. Analogously, the normalized cooling air pressure ratio $\pi_{cool}$ and, as a result, the normalized cooling air mass flow $m_{cool}$, can be raised by lowering the mechanical speed $n_{mech}$. Correspondingly, the cooling air ratios can be controlled for design conditions independently of the compressor inlet temperature, and thus kept at the design value, by controlling the speed.

The following exemplary embodiments disclose advantages of the invention at under-frequency and over-frequency events. They are described for a plant with electrical decoupling between the power grid 21. The required speed control and identical operating modes can be achieved by controlling the transmission ratio of the variable electronic gear unit 27.

Figure 11:
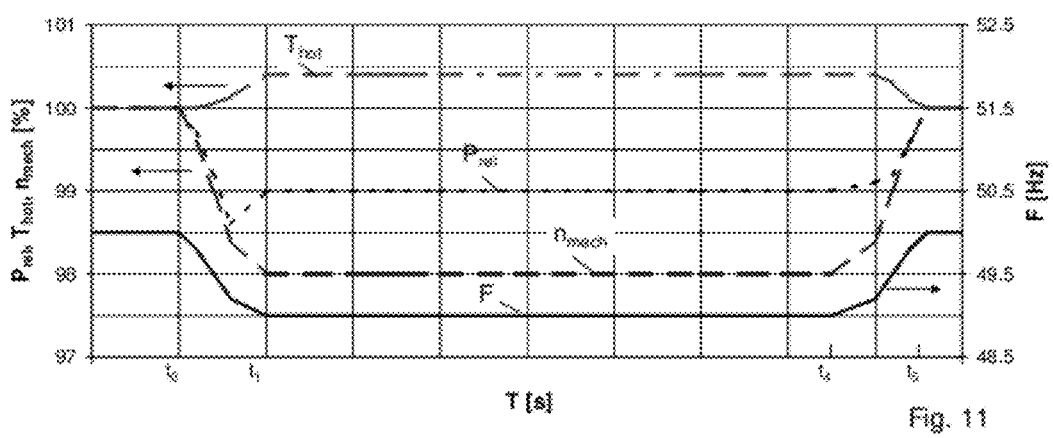
FIG. 11 shows the variation with time of a relatively long under-frequency event with fixed coupling according to the prior art.
Figure 12:
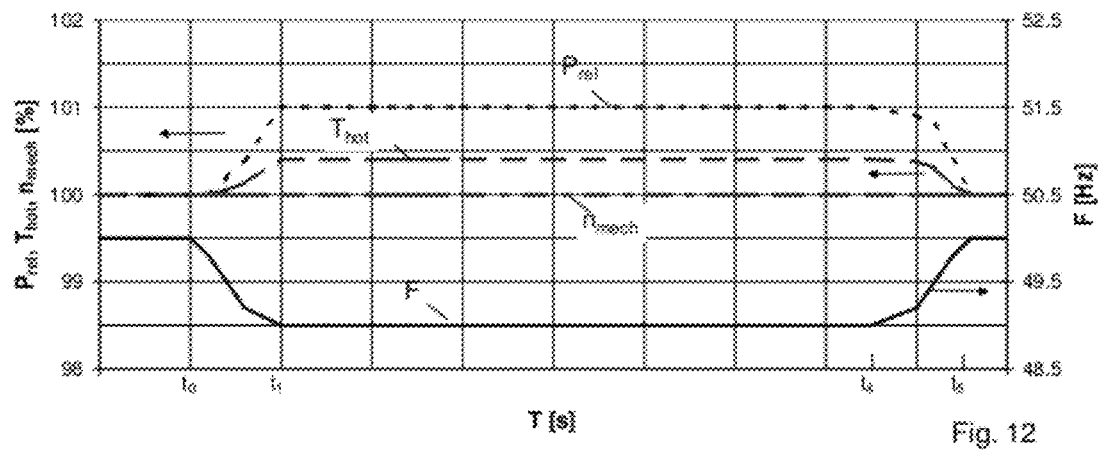
FIG. 12 shows the variation with time of a relatively long under-frequency event with electronic decoupling.
Figure 13:
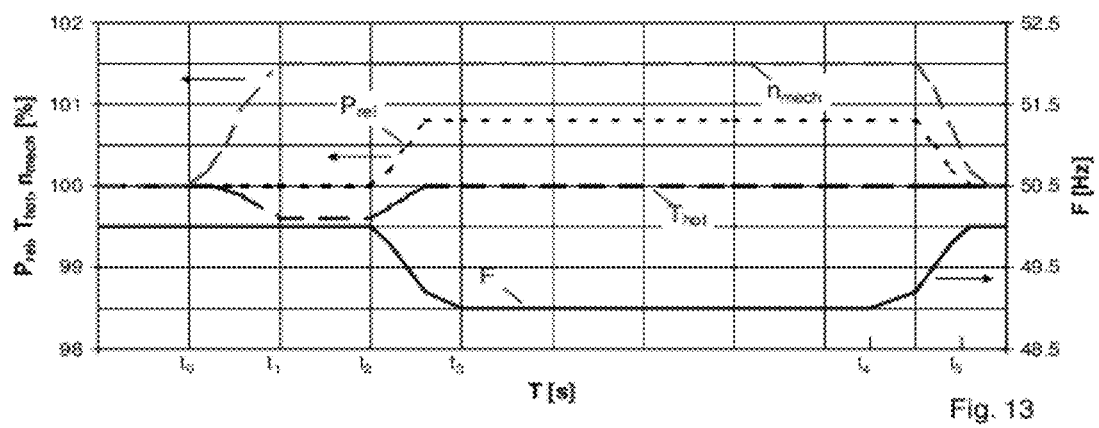
FIG. 13 shows the variation with time of a relatively long under-frequency event with electronic decoupling and anticipated under-frequency event.

FIGS. 11 to 13 diagrammatically show examples of longer-lasting under-frequency events. They are described for a gas turbine 12 operated in a 50 Hz power grid 21 but can also be applied analogously for operation in a 60 Hz power grid 21 or a power grid 21 having a different design frequency. By analogy, this also provides the person of ordinary skill in the field with corresponding concepts for over-frequency events. Interference signals, small high-frequency variations in the grid frequency F, or noise have been omitted and are not shown.

FIG. 11 diagrammatically shows the variation of a longer-lasting under-frequency event for a conventional gas turbine 12 with fixed coupling to the power grid 21. Until time $t_2$, the gas turbine 12 is operated at full load and design speed. Between time $t_2$ and $t_3$, the grid frequency F drops from 50 Hz to 49 Hz. With a fixed coupling to the power grid 21, the speed $n_{mech}$, normalized with the design speed, of the gas turbine 12 correspondingly drops from 100% to 98%. Neglecting the kinetic energy of the shaft assembly which is released with a speed reduction, the relative power of the gas turbine $P_{rel}$ initially decreases proportionally to the speed $n_{mech}$, where $P_{rel}$ is the relative power $P_{rel}$ compared to the full load power at 100% speed. Assuming that the control of the gas turbine 12 prevents a rise in the hot gas temperature due to the suction mass flow reduced with the drop in speed, the hot gas temperature $T_{hot}$ initially remains constant. In the present example, it is raised only with a short delay as a response of the controller 39 to the speed-related drop in power. This rise in the hot gas temperature $T_{hot}$ to 100.4% of the full load hot gas temperature leads to the drop in power being partially compensated for and the gas turbine (12) being operated with 99% relative power $P_{rel}$ at only 98% normalized mechanical speed $n_{mech}$ during the relatively long under-frequency event in the present example. In this example, the rise in hot gas temperature $T_{hot}$ is moderate. If it is not possible to accept a loss in power and the grid frequency drops more severely, much higher service-life-critical increases are required.

From time $t_4$ at which the grid frequency F begins to recover again, the normalized mechanical speed $n_{mech}$ correspondingly rises and, as a result, so does the relative power $n_{mech}$ of the gas turbine 12. During the increase in grid frequency between $t_4$ and $t_5$, the relative power of the gas turbine $P_{rel}$ will exceed the power demanded by the power grid 21 for frequency support and correspondingly the hot gas temperature $T_{hot}$ is reduced again until normal full-load operation at design temperature is reached again at time $t_5$.

The hot gas temperature $T_{hot}$ can only be reduced again to its design value when the grid frequency F returns to its nominal value of 50 Hz between $t_4$ and $t_5$. The increase in hot gas temperature $T_{hot}$ above the full-load value is associated with an increased life time consumption. Depending on the power grid demands, a compromise can be made between providing power for supporting frequency and life time consumption.

FIG. 12 diagrammatically shows the variation of the operating parameters during the same longer-lasting under-frequency event by means of an example for a plant with electrical decoupling between power grid 21 and gas turbine 12. In this case, the normalized mechanical speed $n_{mech}$ of the gas turbine 12 is kept at 100% despite the drop in grid frequency F from 50 Hz to 49 Hz. Correspondingly, the relative power $P_{rel}$ and hot gas temperature $T_{hot}$ of the gas turbine 12 remains initially constant immediately after $t_2$ at the beginning of the under-frequency event. The controller only reacts in response to a significant drop in the grid frequency F and increases the hot gas temperature $T_{hot}$ in order to thus also increase the relative power $P_{rel}$ of the gas turbine. In this example, it is possible to avoid not only a drop in gas turbine power but also to deliver a relative power $P_{rel}$ of 101% of the full-load power to the power grid 21 by raising $T_{hot}$ to 100.4%. From time $t_4$, the grid frequency F recovers and, as a consequence, the relative power $P_{rel}$ and correspondingly $T_{hot}$ can be reduced until normal full-load operation is reached again at time $t_5$.

FIG. 13 diagrammatically shows the variation of an anticipated under-frequency event with electronic decoupling. In this example, the operator is informed about an impending event such as, for example, the disconnection of a relatively large power plant from the power grid 21 or the connection of a relatively large load to the power grid 21 which can result in a frequency drop. Correspondingly, he selects a standby mode of the gas turbine 12 at time $t_0$. To prepare for the under-frequency event, the mechanical speed $n_{mech}$ of the gas turbine 12 now rises and reaches, for example, 101.5% at time $t_1$. To keep the load constant at the design full load, the hot gas temperature $T_{hot}$ is reduced in accordance with the increased speed $n_{mech}$. In this context, a loss of efficiency may be accepted compared with operation at the design speed 100% and design hot gas temperature.

At time $t_2$, the anticipated under-frequency event begins. Due to the fact that gas turbine speed $n_{mech}$ and grid frequency F are decoupled, the gas turbine 12 can continue to be operated at the increased speed $n_{mech}$. Corresponding to the lowering of the hot gas temperature $T_{hot}$ carried out with the increase in speed $n_{mech}$ between time $t_0$ and $t_1$, the hot gas temperature $T_{hot}$ can now be increased to increase the power to the full-load value. As a result, the gas turbine is operated with increased speed $n_{mech}$ at design hot gas temperature and can deliver a normalized power which is above the full-load power for frequency support in this example. This normalized power is 100.8% in this example. This can be achieved without having to accept losses in service life which are otherwise normal for frequency support. From time $t_4$, the grid frequency F recovers and as a consequence the relative power $P_{rel}$ and correspondingly the speed $n_{mech}$ can be reduced until normal full-load operation is achieved again at time $t_5$.

To keep the net power of the combined-cycle power plant constant in the period from $t_1$ to $t_2$ before the anticipated under-frequency event, the gas turbine power $P_{rel}$ may have to be raised. Due to the increased speed $n_{mech}$, the mass flow, and thus the pressure ratio over the turbine, is increased. In addition, the hot gas temperature of the gas turbine is dropped. Both result in a decrease in the turbine outlet temperature which can negatively influence the power of the steam turbine in spite of the increased exhaust gas mass flow and is compensated for by the gas turbine power $P_{rel}$.

If the hot gas temperature $T_{hot}$ were additionally also to be increased above the design value during the under-frequency event as in the examples of FIG. 11 and FIG. 12, with the acceptance of losses in service life which is normal for frequency support, the power of the gas turbine $P_{rel}$ would be increased even further above the full-load value.

Depending on the operating state of the gas turbine and the operating concept of the gas turbine 12, a compensation of the increase in power associated with a speed increase is implemented not via the $T_{hot}$ but via another control parameter such as, e.g., the adjustable compressor blades 42 or a combination of control parameters.

The relative powers $P_{rel}$ shown in the figures are related to the power in quasi-steady-state operation. The dynamic power component which occurs with a change in speed of the shaft assembly is omitted.

For the examples shown in FIGS. 11 to 13, the qualitative variation of the steam turbine power typically corresponds to that of the relative power of $P_{rel}$ of the gas turbine 12. For the conventional case of fixed system coupling of the gas turbine 12 in accordance with FIG. 11, the exhaust gas mass flow and the heat available for the water/steam cycle is reduced with the mechanical speed $n_{mech}$ of the gas turbine 12. Due to the reduced mass flow and the increased hot gas temperature $T_{hot}$, however, the exhaust gas temperature 52 of the gas turbine 12 will rise so that the resultant loss in power of the steam turbine 24 is less than that of the gas turbine 12. The power of the steam turbine 12 can even be kept constant or rise with a great increase in the exhaust gas temperature 52. During the under-frequency events shown in FIGS. 12 and 13, the power of the steam turbine 24 will rise due to the increased exhaust gas energy, and thus contribute to supporting the frequency.

The course of fast grid frequency events of the gas turbine 12 and possible influence by the electrical decoupling on the course of such events is shown in FIG. 14 to FIG. 18 by way of example by means of under-frequency events. They are described for a 50-Hz power grid 21 but can also be applied analogously to a 60-Hz power grid 21 or a power grid 21 with a different design frequency. By analogy, the person of ordinary skill in the field thus also obtains the corresponding concepts for over-frequency events. Interference signals, small high-frequency variations of the grid frequency F, or noise have been omitted and are not shown.

The influence of small high-frequency variations of the grid frequency F or noise on the controller can be suppressed by a dead band. This means that frequency changes are only responded to if a limit value is exceeded.

Since it is possible for the grid frequency to slowly drift out of the dead band, but this slow frequency shift is not to be responded to with fast load changes of the gas turbine 12, it is possible to work with the frequency deviation relative to a sliding mean value of the grid frequency plus a dead band around this mean value in the controller. The dead band and the sliding mean value, also called the averaged supply grid frequency, are described in detail in EP0858153 for conventional gas turbines 12 without electrical decoupling from the power grid 21 and gas turbine 12. EP0858153 and its application to gas turbines 12 with electronic decoupling from the power grid 21 are incorporated in the present application by reference.

Figure 14:
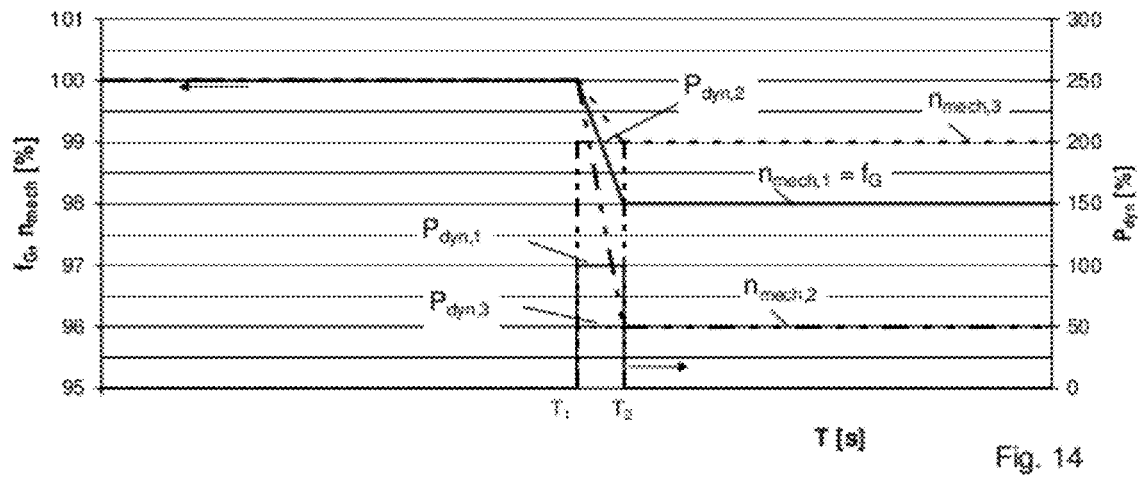
FIG. 14 shows the influence of the ratio of grid frequency change and change in the gas turbine speed on a short-term under-frequency event.
Figure 15:
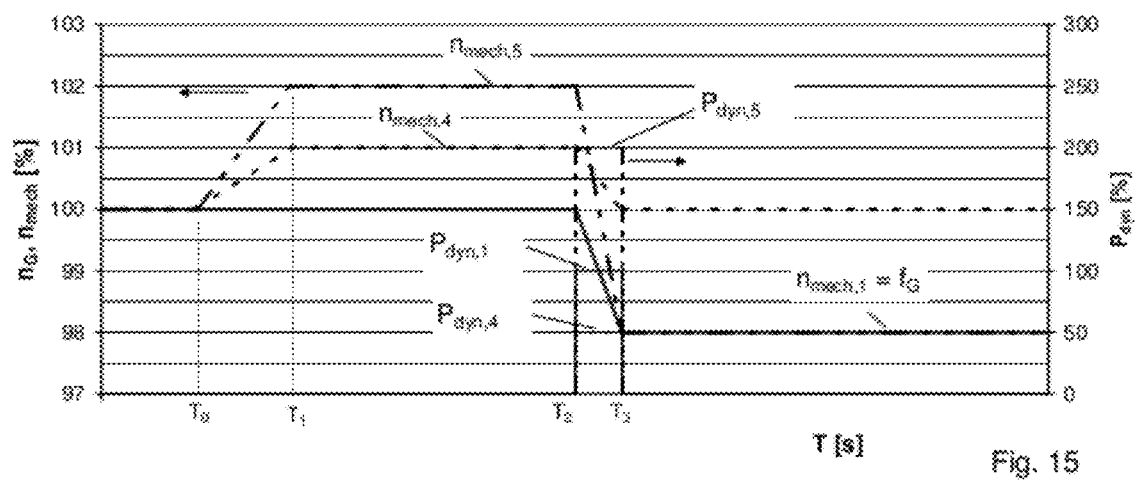
FIG. 15 shows the influence of the ratio of grid frequency change and change in the gas turbine speed on an anticipated short-term under-frequency event.

In FIGS. 14 and 15, the dynamic power $P_{dyn}$ which is delivered during changes of speed of the shaft assembly of a gas turbine 12 is discussed through idealized examples.

FIG. 14 diagrammatically shows the course of the gas turbine speed $n_{mech}$, and the dynamic power $P_{dyn}$ delivered by the gas turbine shaft assembly to the power grid during an under-frequency event. In the example, the grid frequency F drops from 50 Hz to 49 Hz with a constant gradient between times $T_2$ and $T_3$. Due to the change in the kinetic energy of rotation of the shaft assembly, dynamic power $P_{dyn}$ which is proportional to the gradient of the change of speed is delivered during the change of speed. The influence of the ratio between grid frequency change and change in the gas turbine speed on an under-frequency event at a predetermined change in the grid frequency, which is shown here as normalized grid frequency $f_G$, is explained by means of three ratios. In the initial case, the mechanical speed $n_{mech,1}$ f the gas turbine shaft assembly is changed at a ratio of 1:1 as is mandatorily also the or mechanical coupling, with the grid frequency F. Correspondingly, a normalized dynamic power $P_{dyn,1}$ is delivered during the change of speed. This is proportional to the gradient of the change of speed and to the speed, only the dependence with respect to the speed gradient being shown here for simplification.

In the second case, the speed is reduced more than the normalized grid frequency $f_G$ with a ratio of 2:1. Correspondingly, twice the dynamic power $P_{dyn,2}$ can be delivered. However, a reduction in the mechanical speed $n_{mech,3}$ which is twice as large must be accepted for this.

In the third case, the speed is reduced less than the normalized grid frequency $f_G$ with a ratio of 1:2. Correspondingly, only half the dynamic power $P_{dyn,3}$ can be delivered. For this, however, the mechanical speed $n_{mech,3}$ is reduced only half as much so that the quasi-steady-state not drop as from power of the gas turbine does not drop as much and the distance from possible compressor surge remains greater.

FIG. 15 diagrammatically shows the influence of the ratio between grid frequency change and change in the gas turbine speed of electronic decoupling during an anticipated under-frequency event. As a comparison, the first case is again shown in which the change of speed of the shaft assembly $n_{mech,1}$ follows exactly the change in the normalized grid frequency $f_G$ and thus leads to the delivery of the dynamic power $P_{dyn,1}$ during the transients between times $T_2$ and $T_3$. In this example, the operator is informed about an impending event such as, for example, the disconnection of a relatively large power plant from the power grid or the connection of a relatively large load to the power grid, which can result in a frequency drop. Correspondingly, s/he selects a standby mode of the gas turbine at time $T_0$. In preparation for the under-frequency event, the mechanical speed $n_{mech}$ of the gas turbine now increases and reaches an increased mechanical speed $n_{mech}$ at time $T_1$. Correspondingly, the dynamic power $P_{dyn}$ is absorbed by the shaft assembly (not shown).

In the first example of an anticipated under-frequency event, the mechanical speed $n_{mech,4}$ of the gas turbine 12 is initially increased by 1% between $T_0$ and $T_1$. In addition, the speed $n_{mech,4}$ of the gas turbine shaft assembly is reduced less than the normalized grid frequency $f_G$ with a ratio of 1:2 during the grid frequency drop between $T_2$ and $T_3$. Correspondingly, only half the dynamic power $P_{dyn,4}$ can be delivered. For this, however, the mechanical speed $n_{mech,4}$ is reduced only half as much and at the end of the grid frequency drop, the gas turbine 12 is still running at design speed.

In a second example of an anticipated under-frequency event, the mechanical speed $n_{mech,5}$ of the gas turbine is initially increased by 2% between $T_0$ and $T_1$. In addition, the speed of the gas turbine shaft assembly is reduced more than the normalized grid frequency $f_G$ with a ratio of 2:1 during the grid frequency drop between $T_2$ and $T_3$. Correspondingly, twice the dynamic power $P_{dyn,5}$ can be delivered. For this, the mechanical speed $n_{mech,5}$ is also reduced twice as much. Due to the increased speed before the grid frequency drop, however, the gas turbine still runs at the same speed $n_{mech}$ as in the reference case with fixed coupling between power grid 21 and gas turbine 12, at the end of the grid frequency drop.

Figure 16:
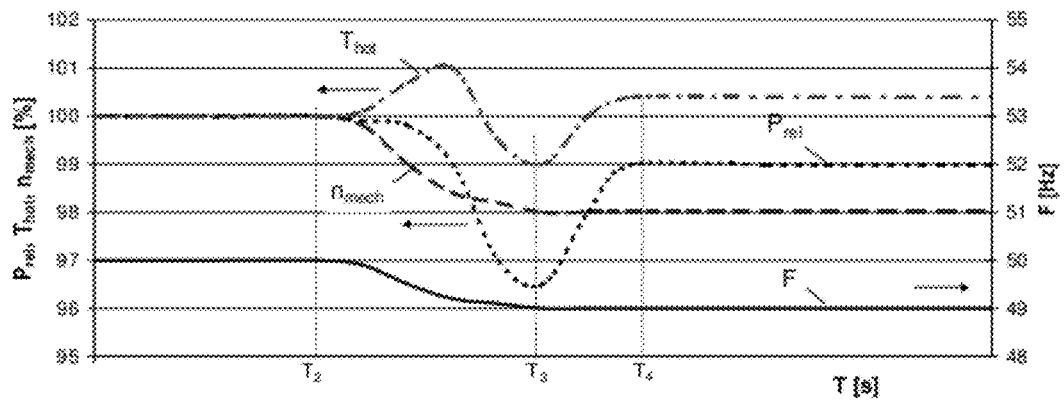
FIG. 16 shows a short-term under-frequency event with fixed coupling.
Figure 16A:
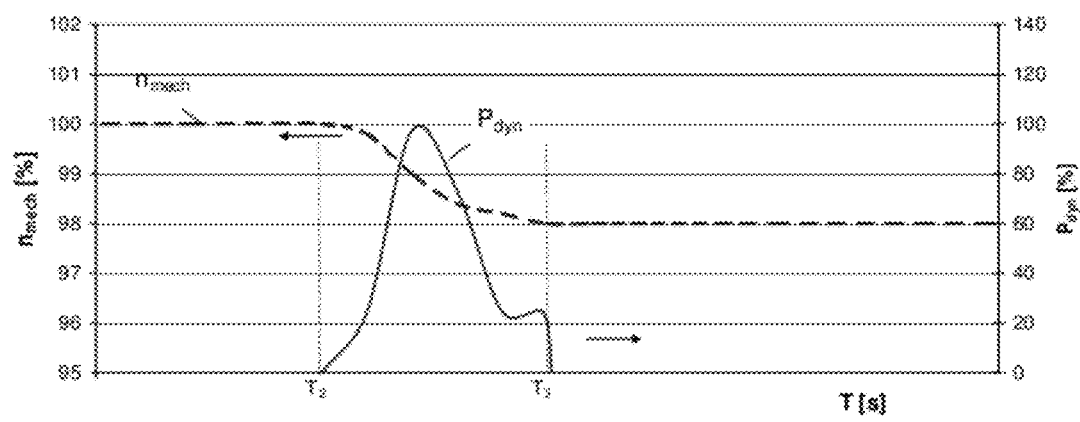
FIG. 16a shows the variation with time of gas turbine speed and dynamic power during a short-term under-frequency event and fixed coupling.
Figure 16B:
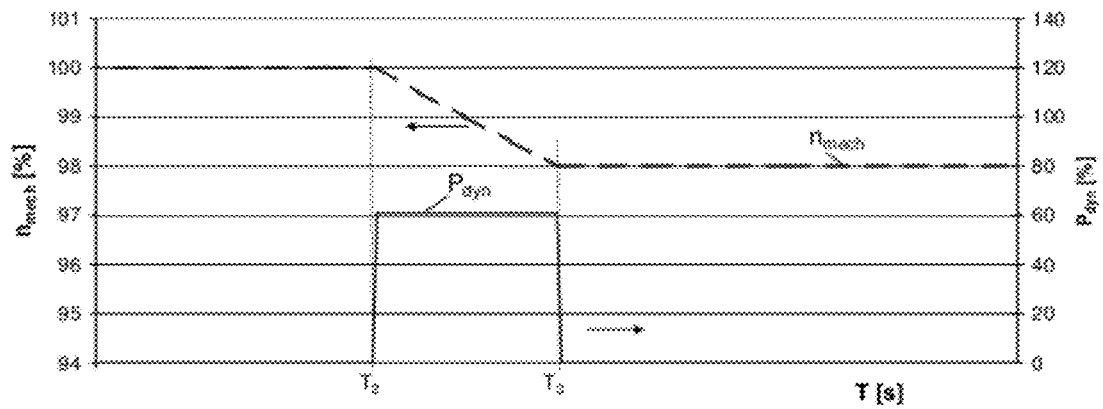
FIG. 16b shows the variation with time of gas turbine speed and dynamic power during a short-term under-frequency event with electronic decoupling and controlled speed gradient.
Figure 17:
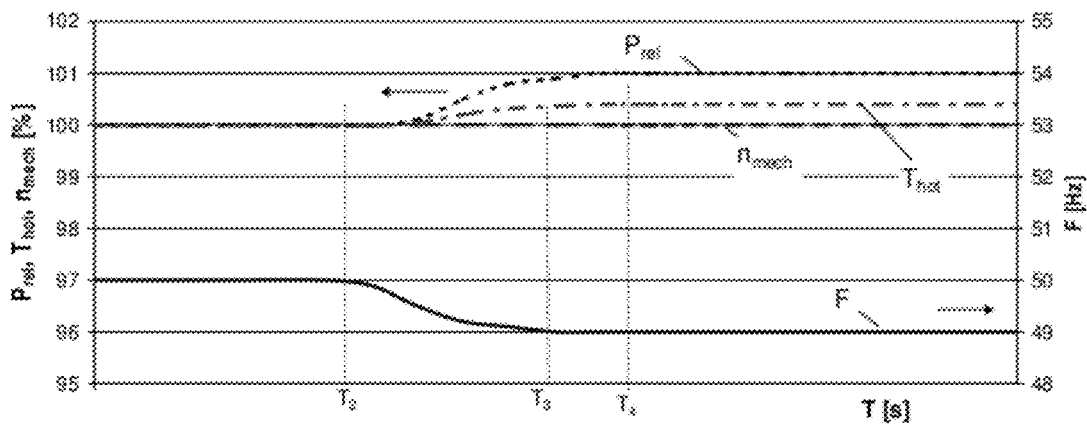
FIG. 17 shows a short-term under-frequency event with electronic decoupling and constant gas turbine speed.
Figure 18:
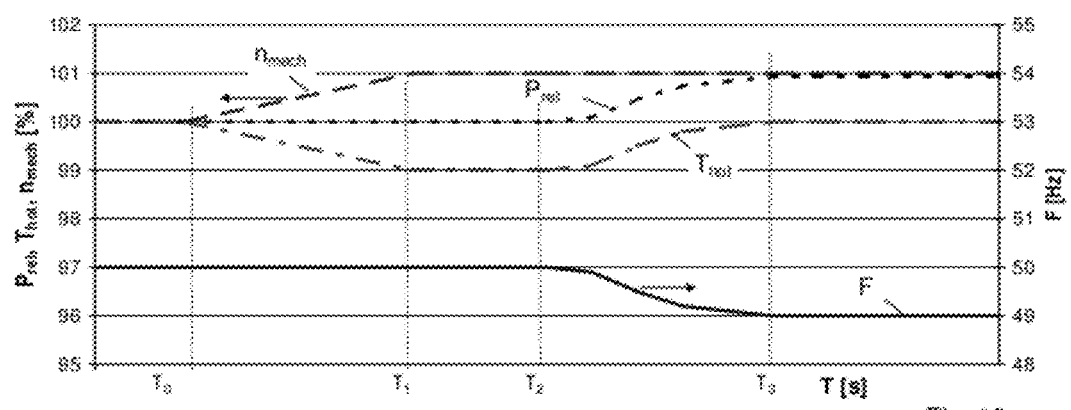
FIG. 18 shows a short-term under-frequency event with electronic decoupling and anticipated under-frequency event.

In FIGS. 16, 17 and 18, the dynamic power $P_{dyn}$ discussed above is omitted and the most important process parameters and the quasi-steady-state power $P_{rel}$ of the gas turbine 12 are shown. Quasi-steady-state power is here understood to be the power which would be delivered by the gas turbine 12 in steady-state operation on the basis of the thermal boundary conditions at the respective speed. The course of the dynamic power $P_{dyn}$ is discussed by way of example with reference to FIGS. 16a and 16b.

FIG. 16 initially diagrammatically shows an example of an under-frequency event with fixed coupling between gas turbine 12 and power grid 21. Starting with full-load operation, a frequency drop occurs between times $T_2$ and $T_3$ in which the grid frequency F drops from 50 Hz to 49 Hz. The mechanical speed $n_{mech}$ corresponding drops from 100% to 98%. The suction mass flow of the gas turbine 12 drops proportionally to a speed (not shown) which, with an initially constant fuel mass flow (also not shown), leads to a rise in the hot gas temperature $T_{hot}$. Due to the reduced suction mass flow, the gas turbine power $P_{rel}$ drops. At the same time, there is initially little loss in power due to the rise in the hot gas temperature $T_{hot}$. The controller 39 of the gas turbine 12 attempts to counteract the steep rise in the hot gas temperature $T_{hot}$ with a time delay. In reality, this leads to an undershooting of the hot gas temperature $T_{hot}$ depending on the transient course of the under-frequency event, the speed of the measuring chains and the time constants of the controller 39. In this example, the minimum hot gas temperature $T_{hot}$ is reached at time $T_3$. At this time, the grid frequency F also becomes stabilized here at 49 Hz. Corresponding to the low mechanical speed $n_{mech}$ and the low hot gas temperature $T_{hot}$ at time $T_3$, the gas turbine power $P_{rel}$ experiences a distinct drop. It is only after a delay at time $T_4$ that the controller brings the hot gas temperature $T_{hot}$ to the nominal value raised for frequency support compared with the design value. In the example, the minimum in the hot gas temperature $T_{hot}$ is reached purely randomly at time $T_3$. Depending on the dynamic range of the controller and the deviation with time of the specific under-frequency event, it can be reached before or after time $T_3$.

FIG. 16a again shows the course of the gas turbine speed $n_{mech}$ of the example of an under-frequency event with fixed coupling between the gas turbine 12 and power grid 21 from FIG. 16. In addition, the associated normalized dynamic power $P_{dyn}$ over time is shown diagrammatically. Corresponding to the course of the frequency change, a maximum in the dynamic power $P_{dyn}$ is obtained at the time of the steepest speed gradient. The normalized dynamic power $P_{dyn}$ shown is normalized with this maximum value.

Depending on the under-frequency event and moment of inertia of the shaft assembly, this maximum can reach the order of magnitude of the full-load power of the gas turbine 12. The power plant and particularly the shaft assembly of the gas turbine 12 and the electrical installations must be designed accordingly.

Due to the electrical decoupling, it becomes possible to avoid such maxima in the dynamic power $P_{dyn}$. FIG. 16b shows as a comparison how the same kinetic energy is delivered in the period between $T_2$ and $T_3$ with a constant gradient in the mechanical speed $n_{mech}$, as in the example from FIG. 16a. However, the dynamic power $P_{dyn}$ is limited to 60% of the maximum value from the example from FIG. 16a. The power plant can be designed correspondingly for lower maxima with decoupling and a controlled or limited speed gradient. In the case of operation with a constant gas turbine speed $n_{mech}$ independent of the power grid 21, the design for dynamic power $P_{dyn}$ can be omitted completely.

When an operating concept is chosen in which the speed $n_{mech}$ of the gas turbine 12 is operated in a controlled manner and decoupled from the power grid 21, the controller 39 can approximately precalculate changes in the suction mass flow and the boundary conditions of the combustion chamber 15, 15* and correspondingly feed forward control the control valves 17, 17*. The transient behavior can thus be improved and maxima in the hot gas temperature can be avoided or reduced.

FIG. 17 diagrammatically shows the same under-frequency event with electronic decoupling and constant gas turbine speed, analogous to FIG. 16. The mechanical speed of the gas turbine $n_{mech}$ remains constant, independently of the grid frequency F. Correspondingly, no direct influence of the grid frequency F on the hot gas temperature $T_{hot}$ and the gas turbine power $P_{rel}$ can be seen at time $T_2$. It is only after a short delay that the controller 39 raises the hot gas temperature $T_{hot}$ in order to increase the gas turbine power $P_{rel}$ for frequency support. The grid frequency F becomes stabilized at 49 Hz at time $T_3$. Due to the inertia of the gas turbine 12, of the measurements and of the controller 39, the gas turbine 12 reaches a quasi-steady-state operation with constant power $P_{rel}$ and hot gas temperature $T_{hot}$ with a short time delay at time $T_4$.

As a further example, FIG. 18 diagrammatically shows an under-frequency event with electronic decoupling, anticipated under-frequency event and a gas turbine speed $n_{mech}$ which is kept constant during the frequency drop. In this example, the operator is informed about an impending event such as, for example, the disconnection of a relatively large power plant from the power grid 21 or the connection of a relatively large load to the power grid 21 which can result in a frequency drop. Correspondingly, s/he selects a standby mode of the gas turbine 12 at time $T_0$. In preparation for the under-frequency event, the mechanical speed $n_{mech}$ of the gas turbine now increases and reaches, for example, 101% at time $T_1$. To keep the load $P_{rel}$ constant at the design full load, the hot gas temperature $T_{hot}$ is reduced in accordance with the increased speed $n_{mech}$. At the same time, a loss in efficiency may be accepted compared with operation at the design speed of 100% and at the design hot gas temperature. Corresponding to the increase in speed, dynamic power $P_{dyn}$ is absorbed (not shown) by the shaft assembly. In addition, the distance of the mechanical speed $n_{mech}$ from a load shedding limit for overspeed is reduced.

At time $T_2$, the anticipated under-frequency event begins. Due to the decoupling of the gas turbine speed $n_{mech}$ and grid frequency F, the gas turbine 12 can still be operated at the increased speed $n_{mech}$.

Corresponding to the decrease in the hot gas temperature $T_{hot}$ carried out with the increase in the speed $n_{mech}$ between times $T_0$ and $T_1$, the hot gas temperature $T_{hot}$ can now be increased to the full-load value in order to increase power. As a result, the gas turbine 12 is operated at an increased speed $n_{mech}$ at the design hot gas temperature and can deliver a normalized power which is above the full-load power for the purpose of frequency support. In this example, this normalized power is about 101%. This can be achieved without having to accept losses in service life which are otherwise usual for frequency support.

The possible operating concepts are not restricted to the examples shown but can be combined and extended in accordance with requirements by the expert in the field. To support the power grid by a high dynamic power $P_{dyn}$ it may be advantageous, for example, first to change the gas turbine speed $n_{mech}$ with a speed gradient which is higher than that of the grid frequency change. Since the permissible speed range of the gas turbine 12 is limited by mechanical and aerodynamic limits, limits are naturally set for this delivery of dynamic power $P_{dyn}$. Before these limits are reached, the gas turbine speed $n_{mech}$ must be stabilized with an adequate safety margin. So that an operating mode with very high dynamic power delivery $P_{dyn}$ does not abruptly change to an operating mode without dynamic power delivery $P_{dyn}$, the mechanical speed $n_{mech}$ can first be reduced with a high gradient which is greater than that of the grid frequency change, up to a first limit which still has a relatively large margin to the design limits of the gas turbine 12. After this first limit has been reached, the speed $n_{mech}$ of the gas turbine 12 can be changed further with a reduced gradient which, for example, is less than that of the grid frequency change. Dynamic power $P_{dyn}$ can still be delivered to the power grid 21 in accordance with this reduced gradient until a second limit is reached. This second limit represents the minimum distance from the design limits of the gas turbine 12 which must be maintained in order to ensure reliable operation. Since the design limits include both mechanical limits and aerodynamic limits, the limits can be functions of the operating conditions of the gas turbine 12, particularly of the mechanical speed $n_{mech}$, the aerodynamic speed and of pressures or pressure ratios.

Apart from an operating mode with fixed gradients or ratios which change incrementally at limits, the ratio between change in mechanical speed $n_{mech}$ and grid frequency change can be selected as a function of the distance from the current mechanical speed $n_{mech}$ of the gas turbine 12 and the design limits. In this context, the ratio goes toward zero when the mechanical speed $n_{mech}$ approaches the minimum distance from the design limits of the gas turbine 12.

When the grid frequency F has stabilized after an under-frequency or over-frequency event, it is possible to move back to the optimum mechanical speed $n_{mech}$ independently of the value of the grid frequency F due to the electrical decoupling of the gas turbine 12. For this purpose, the shaft assembly is accelerated or delayed, respectively, in a controlled manner with a small gradient. The gradient must be selected to be sufficiently small especially with an acceleration of the shaft assembly so that the dynamic power $P_{dyn}$ needed for the acceleration does not result in a significant reduction of the power delivered to the power grid 21. As a rule, the gradient has to be selected in such a manner that only a maximum of about 5% of the gas turbine power is used as dynamic power $P_{dyn}$ for the acceleration. The proportion must preferably be kept even smaller than 3%. In practice, a proportion of less than 1% is adequate.

The behavior of the steam turbine with under-frequency or over-frequency events is not shown in FIGS. 14 to 18. Compared with conventional combined-cycle power plants, the behavior of the steam turbine does not change with short-term frequency changes due to the invariably fixed coupling between power grid and steam turbine. This means that a dynamic power analogous to the examples explained in FIGS. 14 to 16 for the gas turbine with fixed coupling is delivered. The quasi-steady-state power of the steam turbine 24 changes without further measures in accordance with thermal inertia of the water/steam cycle 25 with a delay depending on the exhaust gas flow provided by the gas turbine 12. If due to the speed control of the gas turbine, the speed reduction of the gas turbine 12 is less than the decrease in grid frequency F, the power delivery of the water steam cycle improves in comparison with conventional power plants, in principle. If the speed reduction of the gas turbine 12 is greater than the drop in grid frequency F in order to deliver dynamic power $P_{dyn}$ to the power grid within a short time, the power delivery of the water steam cycle can become worse.

Analogous operating concepts are conceivable for gas turbines 12 with simple combustion chambers as for gas turbines 12 with sequential combustion. In this context, in principle, the possibility exists of using the $T_{hot}$ of both combustion chambers 15, 15' for control or only to change $T_{hot}$ of one combustion chamber 15, 15'. Depending on the operating concept and operating point, the combinations with other parameters can also be provided.

Further process variables such as mass flows, compressor discharge pressure, compressor outlet temperature, cooling air temperatures and pressures and the exhaust gas parameters change in dependence on the selected operating concept in a manner known to the person of ordinary skill in the field.

The ratios of the influences of speed $n_{mech}$ and hot gas temperature $T_{hot}$ on the gas turbine power $P_{rel}$ and the dynamic sequence of control are greatly dependent on the type of construction of the gas turbine 12 and the controller and control parameters implemented. For example, the influence of the hot gas temperature $T_{hot}$ of a second combustion chamber 15' in a gas turbine 12 with sequential combustion is significantly higher than the influence of a first combustion chamber 15. Depending on design criteria of the gas turbine 12 such as, e.g., the mechanical, aerodynamic and cooling requirements, and the power grid requirements, the operating concept of the gas turbine 12 can be optimized in accordance with the exemplary embodiments shown. In this context, the operating concepts are not restricted to the examples shown but can be combined and extended by the expert in the field in accordance with the requirements. Furthermore, for example, embodiments and methods with a multiplicity of various frequency converters are possible, for example, by using multi-level converters, link-circuit converters or direct converters, that is to say current and/or voltage converters.

LIST OF REFERENCE DESIGNATIONS

8 Second generator
9 Shaft of the steam turbine
10, 10', 10" Power plant
11, 11' Power train
12 Gas turbine
13 Compressor
14, 14a, b Turbine
15, 15' Combustion chamber
16 Air inlet
17, 17' Fuel supply
18 First generator
19 Shaft
20 Grid connection (frequency-coupled)
21 Power grid
22 Exhaust gas outlet
23 heat recovery steam generator
24 Steam turbine
25 Water/steam cycle
26 Gear unit (mechanical)
27 Decoupling device or variable electronic gear unit or matrix converter
28 Timer
29 Power section
30 Load
31 Controller
32 Switch (bidirectional)
33 Voltage measuring device
34 Current measuring device
35 Control line
36, . . . , 38 Signal line
39 Controller
40, 41 Control valve
42 Adjustable compressor blades
43, . . . , 47 Sensor
48 Instrument lead (generator frequency/speed)
49 Grid frequency pick-up
50 Cooling air supply
51 Nominal generator speed
52, 52a, b Turbine outlet temperature
53, 54 Sensor, water/steam cycle
55 Water/steam cycle controller
56 Unit controller
57 Control signals heat recovery steam generator
58 Control signals gas turbine controller/unit controller
59 Control signals water/steam cycle controller/unit controller
60 power train
61 Exhaust gas
62 Control signals steam turbine
G1, . . . , G6 Phase (generator)
L1, . . . , L3 Phase (load)
F Frequency (speed)
P Power
$P_{rel}$ Relative power of the gas turbine
A, B Curve
ZL Target power
$T_{k1}$ Compressor inlet temperature
$T_{k1d}$ Compressor inlet temperature under design conditions
$T_{hot}$ Hot gas temperature upstream of turbine inlet of the gas turbine
$t_0$ Time: start of increase in the gas turbine speed $n_{mech}$
$t_1$ Time: gas turbine speed $n_{mech}$ increased
$t_2$ Time: beginning of grid frequency decrease
$t_3$ Time: grid frequency decreased
$t_4$ Time: beginning of grid frequency recovery
$t_5$ Time: grid frequency reaches nominal value again
T Time
$f_G$ Normalized grid frequency
$P_{dyn}$ Dynamic power of the gas turbine shaft assembly which is delivered to the power grid due to the speed gradient
$T_0$ Time: start of increase in the speed of the gas turbine
$T_1$ Time: speed of the gas turbine increased
$T_2$ Time: beginning of grid frequency decrease
$T_3$ Time: grid frequency decreased
$T_4$ Time: GT stabilized
n* Aerodynamic speed
$n_{mech}$ Mechanical speed
$n_{mech\ d}$ Mechanical speed under design conditions
$n_{min}$ Minimum permissible mechanical speed
$n_{max}$ Maximum permissible mechanical speed
$n_d$ Conventional compressor design speed (aerodynamic)
$n_{opt}$ Optimum compressor speed (aerodynamic)
$m_{cool}$ Normalized cooling air consumption $m_{cool\ d}$ Normalized cooling air consumption under design condition
$\pi_{cool}$ Normalized cooling air pressure ratio
$\pi_{cool\ d}$ Normalized cooling air pressure ratio under design condition
$\eta_{comp}$ Compressor efficiency
$\eta_{comp\ d}$ Compressor efficiency under design condition (conventional design)
$\eta_{opt}$ Optimum compressor efficiency
$\Delta n$ Distance from the surge limit of the compressor While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method of operating a power plant, the method comprising:
   providing at least one power train having at least one steam turbine and a second AC generator;
   providing at least one power train having at least one gas turbine and a first AC generator;
   providing a frequency converter between the first AC generator and a power grid having a given grid frequency, wherein the frequency converter comprises a variable electronic gear unit;
   connecting the outputs of the first AC generator and the second AC generator to the power grid;
   directly driving the first AC generator with the at least one gas turbine at an operating frequency;
   directly driving the second AC generator with the at least one steam turbine;
   forcing a speed with the variable electronic gear unit onto the at least one gas turbine with a transmission ratio between the mechanical speed of the at least one gas turbine and the grid frequency via the first AC generator; and
   directly frequency coupling the second AC generator to said power grid.

2. The method as claimed in claim 1, further comprising:
   providing a grid frequency pick-up, a speed measurement unit for the first generator, and a gas turbine controller; and
   communicating speed data from the measurement unit to the controller.

3. The method as claimed in claim 1, wherein forcing a speed comprises forcing with a transmission ratio which is not constant.

4. The method as claimed in claim 1, wherein forcing a speed comprises forcing with a transmission ratio which is constant.

5. The method as claimed in claim 1, wherein:
   the grid frequency is 60 Hz;
   directly driving the first AC generator comprises driving at an operating frequency of 50 Hz; and
   directly driving the second AC generator comprises driving at an operating frequency of 60 Hz.

6. The method as claimed in claim 1, wherein:
   the grid frequency is 50 Hz;
   directly driving the first AC generator comprises driving at an operating frequency of 60 Hz; and
   directly driving the second AC generator comprises driving at an operating frequency of 50 Hz.

7. The method as claimed in claim 1, wherein providing a frequency converter comprises providing a matrix converter.

8. The method as claimed in claim 7, wherein providing a matrix converter comprises providing a controller and a plurality of controllable bidirectional switches arranged in an (m×n) matrix, the switches being configured and arranged to selectively connect m inputs to n outputs, where m is greater than n;
   determining the signs of the currents in the inputs;
   determining the signs of the voltages between the inputs;
   communicating said voltage and current signs to the controller; and
   controlling the switches with the controller based on said voltage and current signs.

9. A power plant comprising:
   at least one power train having at least one steam turbine and a second AC generator directly driven by the at least one steam turbine, the output of the second AC generator to be connected to a power grid having a given grid frequency; and
   at least one power train having at least one gas turbine and a first AC generator with an operating frequency driven directly by the at least one gas turbine, the output of which first AC generator to be connected to said power grid;
   a frequency converter arranged between the first AC generator and the power grid;
   wherein the second AC generator is coupled directly with respect to frequency to said power grid;
   wherein the frequency converter comprises at least one matrix converter; and
   wherein said at least one matrix converter is configured and arranged to smooth current delivered to the power grid by superimposing current generated by the at least one first AC generator and delivered to the power grid on current generated by the second AC generator.

10. The power plant as claimed in claim 9, wherein the at least one gas turbine comprises a sequential combustion gas turbine.

11. The power plant as claimed in claim 9, wherein the at least one gas turbine has a design frequency of less than 50 Hz.

12. The power plant as claimed in claim 9, wherein the at least one gas turbine is configured and arranged for variations in the aerodynamic speed of less than plus/minus 10%.

13. The power plant as claimed in claim 9, wherein the at least one gas turbine comprises a compressor with a distance from the surge limit of less than 10% of the aerodynamic speed at design conditions.

14. The power plant as claimed in claim 9, further comprising:
   a water/steam cycle configured and arranged for full-load variations in an exhaust gas mass flow of the at least one gas turbine of less than plus/minus 5%.

15. A method for operating a power plant, the method comprising:
providing a power plant comprising
at least one power train having at least one steam turbine and a second AC generator directly driven by the at least one steam turbine, the output of the second AC generator to be connected to a power grid having a given grid frequency,
at least one power train having at least one gas turbine and a first AC generator with an operating frequency driven directly by the at least one gas turbine, the output of which first AC generator to be connected to said power grid,
a frequency converter arranged between the first AC generator and the power grid, and
wherein the second AC generator is coupled directly with respect to frequency to said power grid;
permanently coupling the speed of the at least one steam turbine to the grid frequency of the electrical power grid; and
controlling the aerodynamic speed of the at least one gas turbine.

16. The method as claimed in claim 15, wherein:
the first AC generator is separated from the grid frequency by an electronic decoupling device; and
controlling comprises controlling the speed of the at least one gas turbine independent of the grid frequency.

17. The method as claimed in claim 15, wherein controlling comprises controlling the mechanical or aerodynamic speed of the at least one gas turbine as a function of at least one parameter of the power plant.

18. The method as claimed in claim 15, wherein controlling comprises controlling the mechanical or aerodynamic speed of the at least one gas turbine as a function of exhaust gas enthalpy, exhaust gas temperature, exhaust gas mass flow, or combinations thereof.

19. The method as claimed in claim 15, wherein the at least one gas turbine comprises a compressor configured and arranged to compress combustion air, and further comprising:
measuring the discharge pressure of the compressor, the final temperature of the compressor, the feed-in conditions of cooling air branched off from the compressor, or combinations thereof; and
controlling the mechanical or aerodynamic speed of the at least one gas turbine based on said measuring.

20. The method as claimed in claim 15, further comprising:
predetermining a target power for the operation of the at least one gas turbine; and
controlling the mechanical or aerodynamic speed of the at least one gas turbine as a function of the target power.

21. The method as claimed in claim 15, wherein controlling comprises controlling the mechanical speed to a constant value as soon as at least one limit value is reached.

22. The method as claimed in claim 15, wherein controlling comprises controlling to control targets optimized in dependence on the conditions of erection of the power plant.

23. The method as claimed in claim 15, wherein controlling comprises controlling the ratio of the mechanical or aerodynamic speed of the at least one gas turbine to the grid frequency to a constant value.

24. The method as claimed in claim 15, further comprising:
transmitting a nominal speed formed by a controller of the water/steam cycle to a controller of the at least one gas turbine, to a controller of the variable electronic gear unit, or to both.

25. The method as claimed in claim 15, wherein controlling comprises controlling the mechanical or aerodynamic speed of the at least one gas turbine via a transmission ratio between the mechanical speed and the grid frequency.

26. The method as claimed in claim 25, further comprising:
transmitting a nominal speed formed by a controller of the gas turbine to a controller of a variable electronic gear unit.

27. The method as claimed in claim 15, wherein the at least one steam turbine changes speed with the grid frequency, and wherein, with longer-lasting changes in the grid frequency, controlling comprises maintaining the mechanical or aerodynamic speed of the gas turbine constant and adapting the power of the at least one gas turbine without delay.

28. The method as claimed in claim 27, further comprising:
preceding an anticipated under-frequency event, increasing the speed of the at least one gas turbine.

29. The method as claimed in claim 28, further comprising:
maintaining the power output of the power plant constant during said increasing speed.

30. The method as claimed in claim 27, further comprising:
preceding an anticipated over-frequency event, decreasing the speed of the at least one gas turbine.

31. The method as claimed in claim 30, further comprising:
maintaining the power output of the power plant constant during said decreasing speed.

32. The method as claimed in claim 15, wherein, when short-term over-frequency or under-frequency events occur in the power grid, the at least one steam turbine speed changes with the grid frequency, and wherein controlling comprises changing the mechanical speed of the at least one gas turbine in a controlled manner.

33. The method as claimed in claim 32, wherein controlling comprises, upon an under-frequency of the power grid, decreasing the mechanical speed of the at least one gas turbine to a greater or lesser extent than the grid frequency.

34. The method as claimed in claim 32, wherein controlling comprises, upon an over-frequency of the power grid, increasing the mechanical speed of the at least one gas turbine to a greater or lesser extent than the grid frequency.

35. The method as claimed in claim 32, wherein controlling comprises controlling the speed gradient of the at least one gas turbine to take a predetermined kinetic power from a shaft assembly of the at least one gas turbine and feed it as electrical power into the power grid.

* * * * *